(12) United States Patent
  Zamierowski et al.

(10) Patent No.: US 10,186,172 B2
(45) Date of Patent: *Jan. 22, 2019

(54) BLOOD GLUCOSE TESTING AND MONITORING SYSTEM AND METHOD

(71) Applicant: Johnson County Community College Foundation, Inc., Overland Park, KS (US)

(72) Inventors: David S. Zamierowski, Overland Park, KS (US); Kathy A. Carver, Overland Park, KS (US)

(73) Assignee: JC3 Innovations, LLC, Overland Park, KS (US)

( * ) Notice: Subject to any disclaimer, the term of this patent is extended or adjusted under 35 U.S.C. 154(b) by 488 days.

This patent is subject to a terminal disclaimer.

(21) Appl. No.: 14/918,485

(22) Filed: Oct. 20, 2015

(65) Prior Publication Data

US 2016/0111022 A1    Apr. 21, 2016

Related U.S. Application Data

(60) Provisional application No. 62/066,284, filed on Oct. 20, 2014.

(51) Int. Cl.
  *G09B 23/00* (2006.01)
  *G09B 23/30* (2006.01)
(52) U.S. Cl.
  CPC .................... *G09B 23/30* (2013.01)
(58) Field of Classification Search
  CPC ........ G09B 23/30; G09B 23/303; G09B 9/00; G09B 23/285; G09B 23/306; G09B 5/02; G09B 23/28

(Continued)

(56) References Cited

U.S. PATENT DOCUMENTS 2,582,234 A    1/1952   Conzelman
2,656,545 A   10/1953   Conzelman, Jr.
(Continued)

FOREIGN PATENT DOCUMENTS

WO          2005122105         12/2005
WO    WO 2005122105 A2 *  12/2005  ........... G09B 23/285

OTHER PUBLICATIONS

Madhu Mohan N., Anoop A. E., Guruvayurappan K., Simulation of a Multi-Strip BLood Glucometer, 2014, IEEE.*

(Continued)

*Primary Examiner* — Sam Yao
*Assistant Examiner* — Lily M Del Valle
(74) *Attorney, Agent, or Firm* — Law Office of Mark Brown, LLC; Mark E. Brown; Ryan S. Hinderliter

(57) ABSTRACT

A fluid analysis simulation and training system and method. An embodiment includes an educational monitor that allows desired data and results to be displayed on a simulated glucometer as part of a faculty computer. In this embodiment, a faculty member controls the data displayed depending on the action of the learners. The present invention also discloses a model allowing the opportunity to practice the skill of obtaining a blood sample in a simulated environment. The model includes a simulated finger configured for placement over a manikin or simulated patient's finger and for holding a simulated patient fluid. In an exemplary embodiment, the simulated patient fluid includes a predetermined amount of glucose and is configured for testing with a standard glucometer. In another embodiment, the simulated patient fluid is inert, and a faculty member, or instructor, controls the display on a simulated glucometer.

16 Claims, 37 Drawing Sheets

(58) Field of Classification Search
USPC .............................. 434/267, 262, 268, 272
See application file for complete search history.

(56) References Cited

U.S. PATENT DOCUMENTS

| | | | |
|---|---|---|---|
| 2,689,415 A | 9/1954 | Haver | |
| 4,072,856 A | 2/1978 | Eligehausen | |
| D293,379 S | 12/1987 | Link | |
| 4,726,772 A | 2/1988 | Amplatz | |
| 4,889,117 A | 12/1989 | Stevens | |
| 5,053,341 A | 10/1991 | Companion | |
| 5,099,424 A | 3/1992 | Schneiderman | |
| 5,344,611 A | 9/1994 | Vogler et al. | |
| 5,385,474 A | 1/1995 | Brindle | |
| 5,391,081 A | 2/1995 | Lampotang et al. | |
| 5,584,701 A | 12/1996 | Lampotang et al. | |
| 5,604,200 A | 2/1997 | Taylor-McCord | |
| 5,605,837 A * | 2/1997 | Karimi .................. G01N 33/96 |
| | | | 252/408.1 |
| 5,769,640 A | 6/1998 | Jacobus et al. | |
| 5,800,466 A | 9/1998 | Routh et al. | |
| 5,842,987 A | 12/1998 | Sahaderan | |
| 5,853,292 A | 12/1998 | Eggert et al. | |
| 6,074,213 A | 6/2000 | Hon | |
| 6,113,395 A | 9/2000 | Hon | |
| 6,126,450 A | 10/2000 | Mukai et al. | |
| 6,193,519 B1 | 2/2001 | Eggert et al. | |
| 6,236,878 B1 | 5/2001 | Taylor | |
| 6,283,763 B1 | 9/2001 | Matsuzaki et al. | |
| 6,351,671 B1 | 2/2002 | Myklebust et al. | |
| 6,517,354 B1 | 2/2003 | Levy | |
| 6,654,000 B2 | 11/2003 | Rosenberg | |
| 6,739,877 B2 | 5/2004 | Bailey et al. | |
| 6,773,263 B2 | 8/2004 | Nicholls | |
| 6,918,771 B2 | 7/2005 | Arington et al. | |
| 6,929,481 B1 | 8/2005 | Alexander et al. | |
| 7,119,810 B2 | 10/2006 | Sumanaweera et al. | |
| 7,156,664 B2 | 1/2007 | Wallaker | |
| 8,100,695 B2 | 1/2012 | Duprez et al. | |
| 8,251,703 B2 | 8/2012 | Zamierowski et al. | |
| 8,548,778 B1 | 10/2013 | Hart et al. | |
| 8,944,825 B2 | 2/2015 | Reid-Searl et al. | |
| 2003/0216625 A1 | 11/2003 | Phipps | |
| 2004/0005044 A1* | 1/2004 | Yeh ..................... H04L 12/2803 |
| | | | 379/142.01 |
| 2004/0161732 A1 | 8/2004 | Stump | |
| 2006/0269906 A1 | 11/2006 | White | |
| 2007/0111174 A1 | 5/2007 | Kozmenko et al. | |
| 2007/0122785 A1 | 5/2007 | Eggert | |
| 2008/0059133 A1 | 3/2008 | Edwards | |
| 2009/0098522 A1 | 4/2009 | Marcovitz | |
| 2009/0187351 A1* | 7/2009 | Orr ..................... A61B 5/14532 |
| | | | 702/19 |
| 2009/0263775 A1 | 10/2009 | Ullrich | |
| 2009/0291421 A1 | 11/2009 | Duprez et al. | |
| 2012/0197619 A1 | 8/2012 | Namer Yelin et al. | |
| 2013/0052626 A1 | 2/2013 | Hoskins | |
| 2014/0065589 A1 | 3/2014 | Zamierowski et al. | |
| 2014/0141398 A1 | 5/2014 | Zamierowski et al. | |
| 2015/0140539 A1 | 5/2015 | Zamierowski et al. | |
| 2015/0206457 A1 | 7/2015 | Zamierowski et al. | |
| 2017/0140673 A1 | 5/2017 | Zamierowski et al. | |

OTHER PUBLICATIONS

"International Search Report and Written Opinion", PCT/US2015/013147, dated May 7, 2015, pp. 1-8.
"www.mountguys.com", Golf Cart Holder Mount for Apple iPad.
B-Line Medical, "Production Information", B-Line Medical Production Information, Website www.blinemedical.com, Copyright 2005 B-Line Medical, LLC.
Datascope, Datascope Corp. Website, www.datascope.com, patient monitoring products, Copyright 2006 Datascope Corp.
Gaumard, "The Total Mobile Solution . . . for a new standard in simulation", Gaumard Simulators for Health Care Education Product Catalog, 2007, pp. 1-116.
Nasco, "Nasco Healthcare Educational Materials", Nasco 2007-2008 Catalog, 2007, pp. 1-164.

* cited by examiner

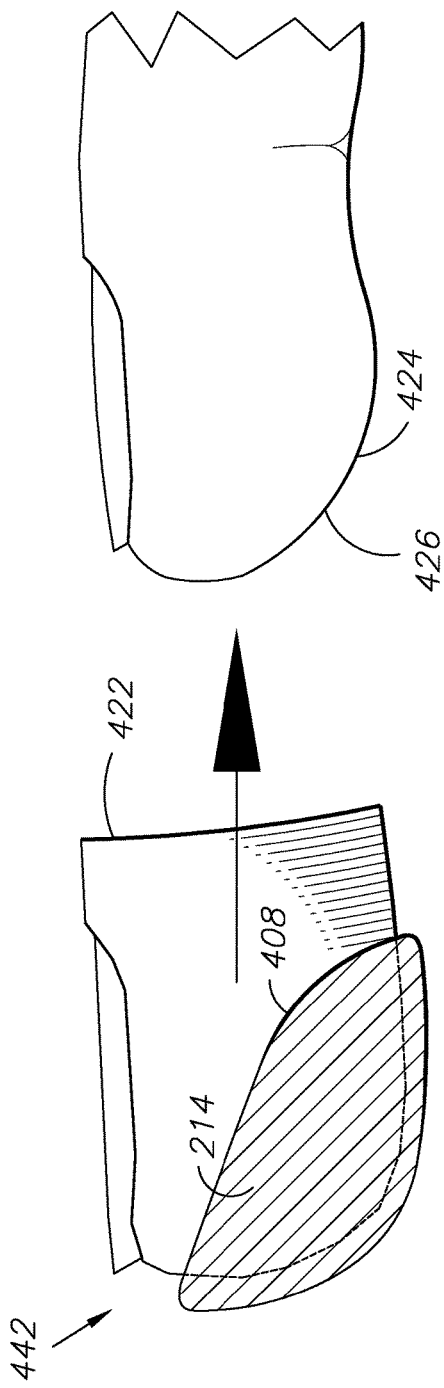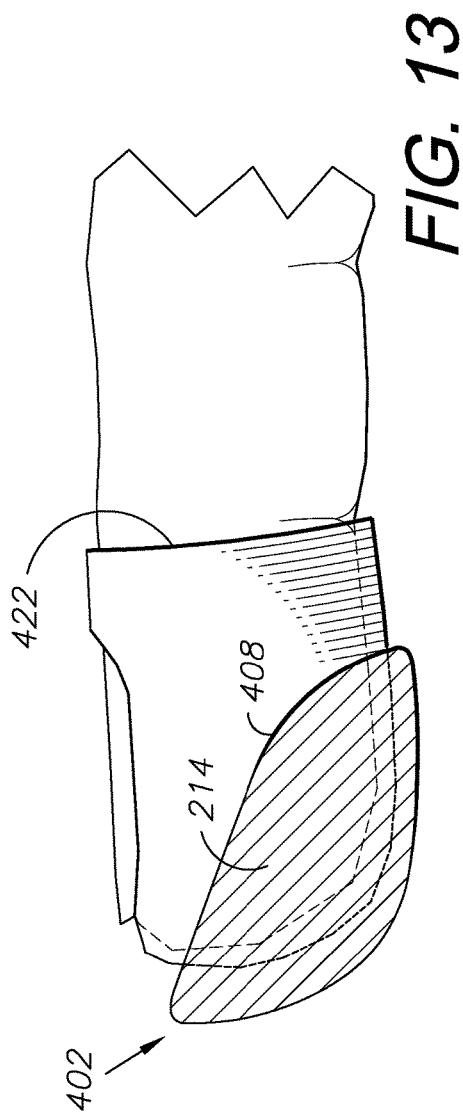
FIG. 12
FIG. 13

BLOOD GLUCOSE TESTING AND MONITORING SYSTEM AND METHOD

CROSS-REFERENCE TO RELATED APPLICATIONS

This application claims priority in U.S. Provisional Patent Application Ser. No. 62/066,284, filed Oct. 20, 2014, which is incorporated herein by reference. This application also incorporates by reference U.S. patent application Ser. No. 14/607,013, filed Jan. 27, 2015; U.S. patent application Ser. No. 14/594,126, filed Jan. 10, 2015; U.S. patent application Ser. No. 14/165,485, filed Jan. 27, 2014; U.S. patent application Ser. No. 13/597,187, filed Aug. 28, 2012; and U.S. patent application Ser. No. 11/751,407, filed May 21, 2007, now U.S. Pat. No. 8,251,703, issued Aug. 28, 2012.

BACKGROUND OF THE INVENTION

1. Field of the Invention

The present invention relates generally to a design of a finger model and a monitor that portrays a realistic blood glucose procedure to enhance bedside monitoring capability.

2. Description of the Related Art

Simulation is an immersive learning experience that depends on a realistic environment to engage the learner. In simulation scenarios, particularly medical treatment simulations, it is important for data to be assessed and displayed realistically to maintain learner engagement within the simulated environment. Monitoring blood glucose is a common bedside procedure performed in the treatment of many different medical conditions.

Blood sugar concentration or blood glucose level is the amount of glucose (sugar) present in the blood, which is normally tightly regulated as part of metabolic homeostasis. Many medical conditions require monitoring blood glucose. Changing blood glucose levels is inherently a primary concern or potential complication of many different illnesses or health alterations.

For example, monitoring blood glucose is extremely important for the health of patients with diabetes. Hyperglycemia, or high blood glucose, is a common indicator of a diabetic medical condition. Long-term hyperglycemia can cause health problems associated with diabetes, including heart disease, eye damage, kidney damage, and nerve damage. Diabetes directly affects about 10% of all adults, and diabetes was reported as the primary diagnosis for approximately 30 million visits last year to various healthcare facilities. Diabetes is reported as one of the seven major contributing factors for heart disease and cardiac arrest by the American Heart Association. In fact, about two thirds of patients with diabetes die of heart disease or stroke.

Conversely, hypoglycemia, or low blood glucose, is a potentially fatal medical condition which can be associated with lethargy, impaired mental function, muscular weakness, and brain damage. Patients with such medical conditions are commonly carefully monitored at frequent intervals to avoid serious medical complications. Emergency or "code blue" scenarios and stroke protocols need to establish blood glucose for differential diagnosis and management of patient symptoms. Thus, a realistic simulation of testing blood glucose levels would be extremely beneficial for training medical professionals as well as diabetes patients.

Currently, there are no monitors or devices available to adequately simulate a finger stick for obtaining a blood sample capable of use with simulators, manikins, or standardized patients. Typically, a finger stick would puncture a manikin finger or a real finger of a standardized patient. Additionally, there are no models or devices available to simulate different blood glucose levels of a patient that can be used with a real glucometer or simulated glucometer.

SUMMARY OF THE INVENTION

The present invention discloses an educational monitor that allows desired data and results to be displayed on a simulated glucometer as part of a faculty computer. In this embodiment, a faculty member controls the data displayed depending, at least in part, on the action of the learners.

The present invention also discloses a model allowing the opportunity to practice the skill of obtaining a blood sample in a simulated environment. The model includes a simulated finger configured for placement over a manikin or simulated patient's finger and for holding a simulated patient fluid. In one exemplary embodiment, the simulated patient fluid includes a predetermined amount of glucose and is configured for testing with a standard glucometer. In another embodiment, the simulated patient fluid is inert, and a faculty member, or instructor, controls the display on a simulated glucometer. The present invention can be used with all types of simulation, including but not limited to simulators, manikins, and standardized patients.

The invention creates a low cost, realistic set-up to simulate obtaining blood glucose levels using the skill of accessing blood and includes the option to control results with a monitor device.

BRIEF DESCRIPTION OF THE DRAWINGS

FIG. 12 shows a side, elevational, exploded view of the blood serum interface and a finger.

FIG. 13 shows a side, elevational view of a finger and the blood serum interface including a bleb, a puncture-resistant pad, and a simulated fingertip.

DETAILED DESCRIPTION OF THE PREFERRED EMBODIMENTS

I. Introduction and Environment

Figure 1:
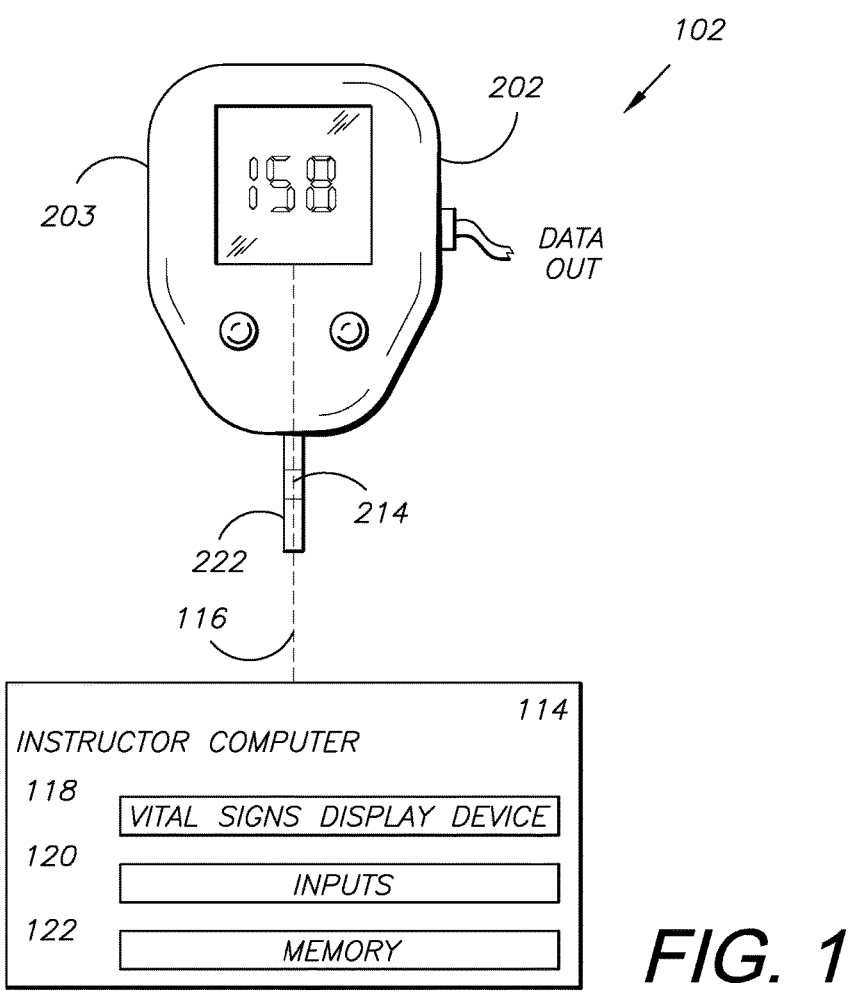
FIG. 1 is a block diagram of a glucometer training system embodying a first aspect of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning II. Simulated Glucometer System Controlled by Instructor In an exemplary embodiment of the present invention, a simulated glucometer 202 is used for simulation of testing for blood glucose levels. In this embodiment, any simulated blood substance can be used in the blood glucose testing simulation. Preferably, the simulated blood substance 214, or simulated patient fluid, is semi-viscous and red in color to best simulate the appearance of blood, however these features are not required. In this simulation, the simulated patient fluid 214 can be filled into a resealable "bleb" 508 of a simulated fingertip 506 (such as the one previously described in U.S. patent application Ser. No. 14/607,013, which is incorporated by reference). The simulated finger 506 is configured for placement over the actual finger 626 of a simulated patient or volunteer or a manikin finger. The bleb 508 is configured for puncture by a clinical lancet 614 to obtain at least one droplet 616 of simulated patient fluid 214 for simulated blood glucose testing. After puncture, a droplet 616 of simulated blood 214 is led to the end of a simulated test tape 222, and the test tape 222 is then placed into a simulated glucometer 202.

In this embodiment, the simulated glucometer 202 has a display screen configured to display data similar to readings on a real, clinical glucometer. An instructor computing device 114 is connected to the simulated glucometer display, and an instructor uses the instructor computing device 114 to control the display data based at least in part on the actions of the user, or student. The instructor computing device 114 can be a laptop computer, a desktop computer, a mobile device, a tablet, or any other type of computing device. Connection 116 of the instructor computing device 114 to the simulated glucometer display can be a wireless internet connection, a hard-wired internet connection, a Bluetooth connection, a wireless intranet connection, a hard-wired intranet connection, or any other type of remote connection. The blood glucose testing simulation 102 is repeated as desired with the instructor controlling the simulated glucometer readings.

FIG. 1 shows a block diagram of a simulation system 102 with an instructor computing device 114 having a connection 116 to a simulated glucometer 202 and being configured to control the output on the simulated glucometer display 203. The instructor computing device 114 includes a vital signs display device (VSDD) 118, inputs 120, and memory 122.

Figure 2:
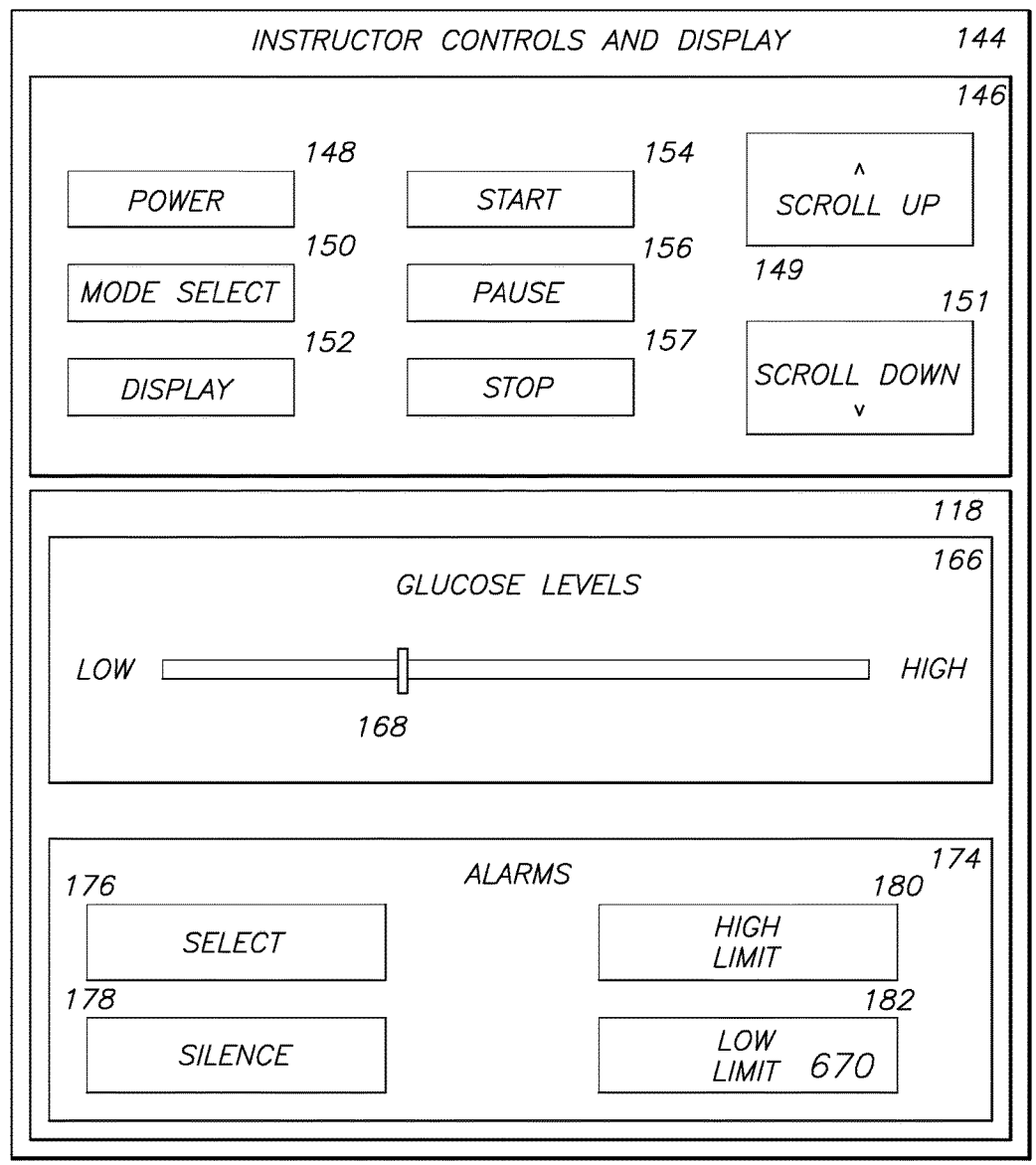
FIG. 2 shows instructor controls and display on an instructor computing device for a glucometer training system.

FIG. 2 shows instructor controls and display 144 for an instructor computing device 114 configured for controlling glucometer simulation. The instructor controls and display 144 include a control section 146 and the VSDD 118. Controls for power 148, mode select 150, display 152, start 154, pause 156, stop 157, scroll up 149, and scroll down 151 can be provided as shown. However, the layout of controls shown in FIG. 2 is merely one embodiment. Alternatively, the control section 146 could have other control buttons and/or a different layout. In this embodiment, the VSDD 118 includes a glucose level section 166 and an alarms section 174. The glucose level section 166 includes a sliding scale 168 for the instructor to adjust the glucose level readings for the glucometer simulation. The glucose level sliding scale 168, set by an instructor, controls the output of blood glucose readings on the simulated glucometer display 203. The alarms section 174 includes a select switch 176, a silence (mute) switch 178, a high limit switch 180, and a low limit switch 182. The limit switches 180, 182 in this embodiment permit entry of values corresponding to high and low blood glucose values which, when exceeded, cause an alarm to be output on the simulated glucometer display 203.

Figure 3:
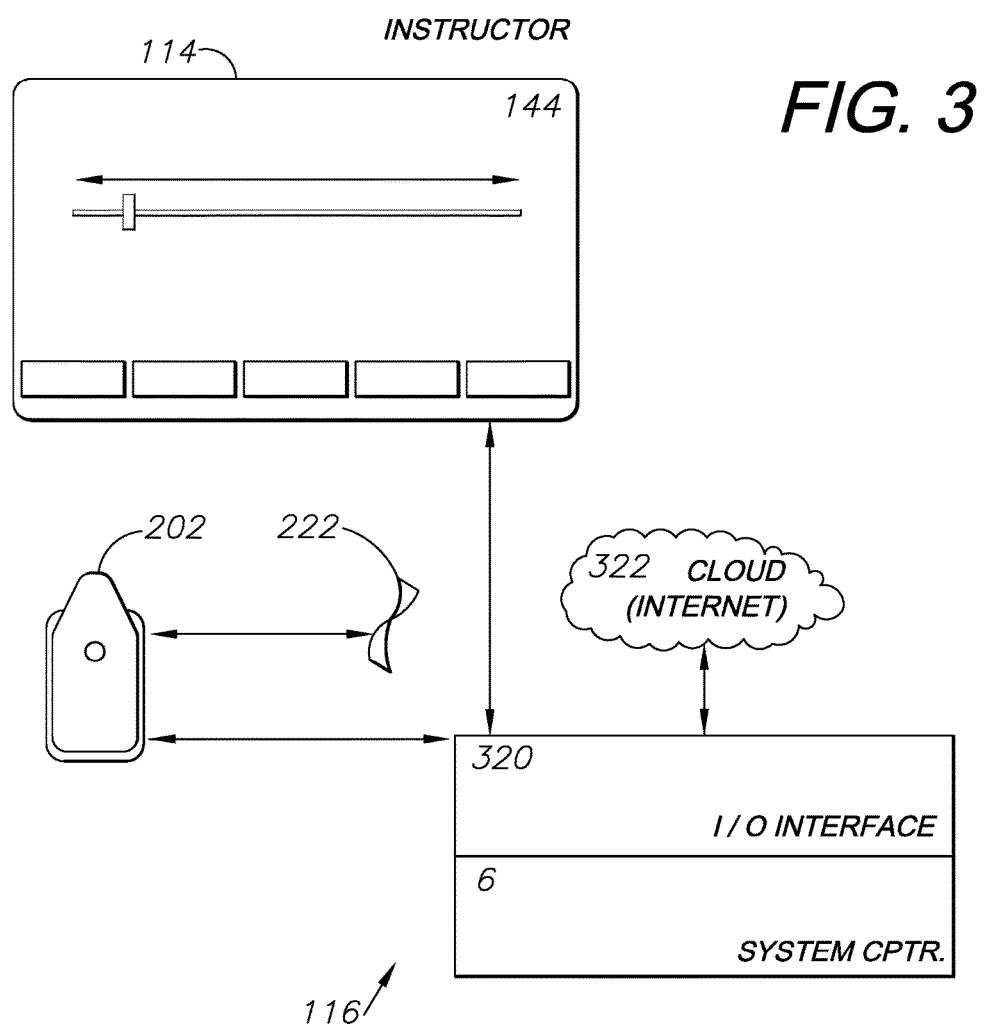
FIG. 3 is a schematic diagram of a glucometer simulation and training system embodying the first aspect of the present invention.
Figure 4:
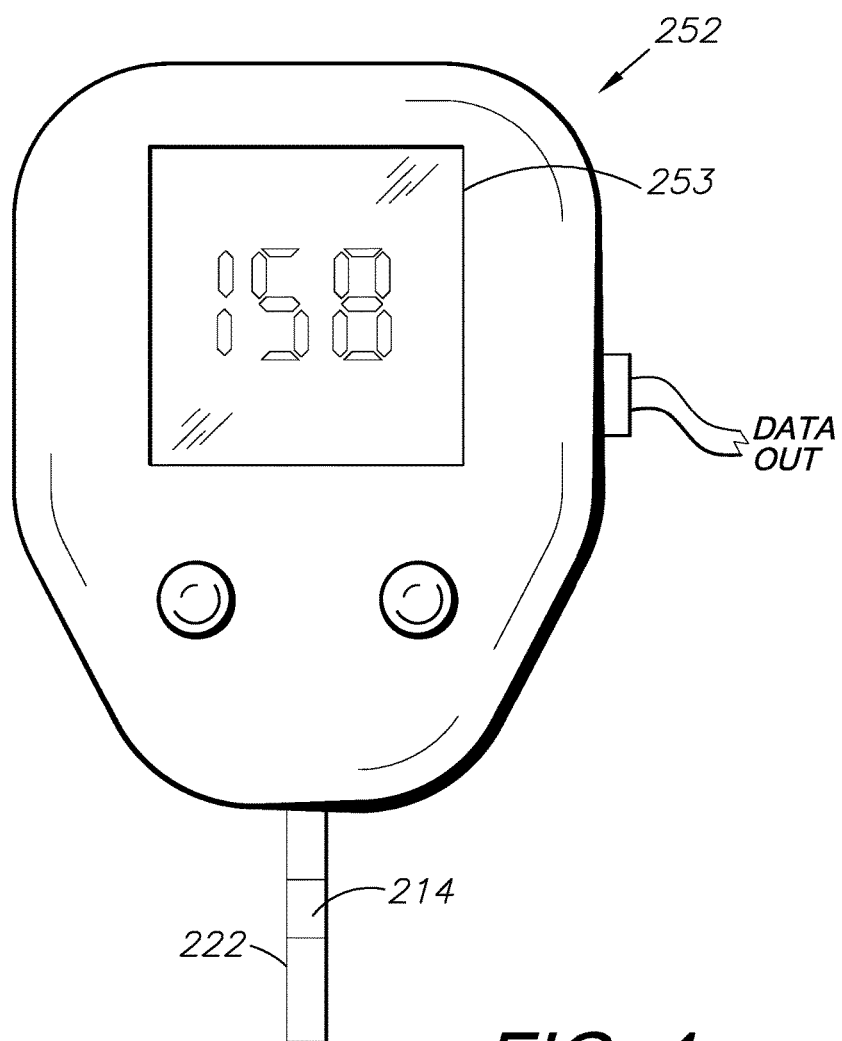
FIG. 4 shows a typical prior art glucometer, which can be used in connection with a second aspect of the present invention.

FIG. 3 shows an embodiment of a connection 116 between an instructor computing device 114 and a simulated glucometer 202, the connection 116 being an internet connection. This embodiment includes a system computer 6 connected to an input/output (I/O) interface component 320 configured to interface with input and output (I/O) devices via the internet, or the cloud 322. The instructor computing device 114 and the simulated glucometer 202 interact with the I/O interface 320. The instructor computing device 114 can be any computing device capable of connecting to an I/O interface 320, including but not limited to a laptop computer, a desktop computer, a tablet, or a smart phone. In a preferred embodiment, the internet connection 322 is wireless, however, a hard-wired internet connection could be used. Alternatively, Bluetooth, wireless intranet, or hard-wired intranet connections could be used. The present system can also be adapted for use with other simulated medical devices.

III. Simulated Patient Fluid for use with Clinical Glucometer

An embodiment of the present invention allows one to use simulated patient fluid 214 with any existing (real, not simulated) clinical glucometer 252. For example, the simulated patient fluid 214 can be used with inexpensive glucometer models for home use, such as models available at Walmart for approximately $10. Most standard glucometers 252 require use with brand specific test tapes 222, or test strips, which will also need to be purchased for the simulation. Any currently available lancet 220 can be used to accomplish a "puncture" to obtain at least one droplet 216 of simulated patient fluid 214 for blood glucose testing.

This simulation first requires preparation of proprietary glucose/imitation blood preparations, or simulated patient fluid 214, to be used in conjunction with fingertip simulators. In this embodiment, the simulated blood preparations 214 are prepared with a predetermined amount of glucose. Such simulated blood 214 can come in kits of simple "low" level blood glucose, "normal" level blood glucose, and "high" level blood glucose. The simulated patient fluids 214 are made up of existing available imitation blood solutions combined with protein or vegetable solutions. Generally, test tapes 222 for all types of glucometers 252 do not respond to simple glucose and water solutions with dye because the test tapes 222 have osmotic and oncotic requirements in order to respond to real, human blood. Because of slight variances in osmotic and oncotic requirements of test tapes 222 from brand to brand, specific glucometer brand to solution preparations may be available so that clientele may use any available glucometers 252 to train with.

Alternatively, the present invention can be used for more complex diabetic care training with a broader range of glucose levels to be imitated. An example larger kit could include the following simulated blood preparations: 40 mg %, 80 mg %, 100 mg %, 125 mg %, 175 mg %, 200 mg %, 250 mg %, 300 mg %, 400 mg %, 500 mg % and 600 mg % blood glucose. This kit would include 11 vials to represent the range of glucose results to be replicated for different medical scenarios. However, the aforementioned example is not limiting. Any set of blood glucose preparations can be customized to simulate any scenarios devised and requisitioned.

In this embodiment, a solution of simulated blood 214 is drawn up from a vial with a needle and syringe 433 and injected into a resealable "bleb" portion 408 of a simulated fingertip. Such a simulated fingertip is designed to be reused several times, with care, making it cost effective. The simulated finger includes at least one bleb 408 configured to hold simulated blood 214 and includes a fingertip guard configured to protect the rubber finger of a manikin or the actual finger of a standardized patient or volunteer from puncture. The disclosed simulated finger can have different configurations, but one configuration is a splint type solid portion (e.g. a distal IP joint extensor rupture splint with distal phalanx pad solid half shell and dorsal middle phalanx extension for holding the splint in place) which mounts one or more blebs.

The simulated finger blebs 408 are configured to be punctured with a lancet 220 to simulate obtaining blood from an actual finger for blood glucose testing. After lancet 220 puncture of a bleb 408 of the simulated finger, a droplet 216 of the previously injected glucose simulation fluid 214 is obtained and led to the end of a test tape 222. The test tape 222 is then inserted into a clinical, or real, glucometer 252, registering the glucose level of the simulated blood 214 on a display screen 253 of the glucometer. This blood glucose testing simulation is repeated as desired with different simulated blood glucose preparations.

Figure 5:
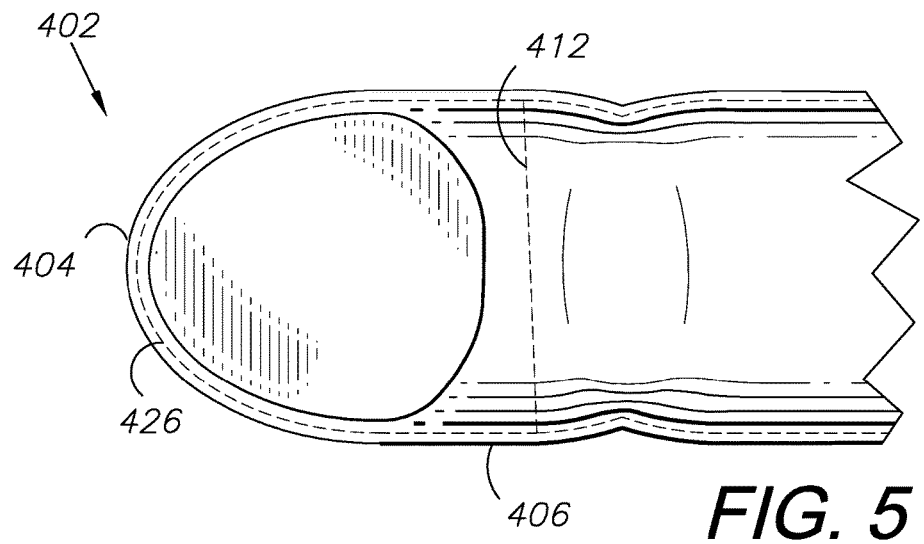
FIG. 5 shows a top, plan view of a finger and a blood serum interface having a protective shield mounting a bleb.
Figure 6:
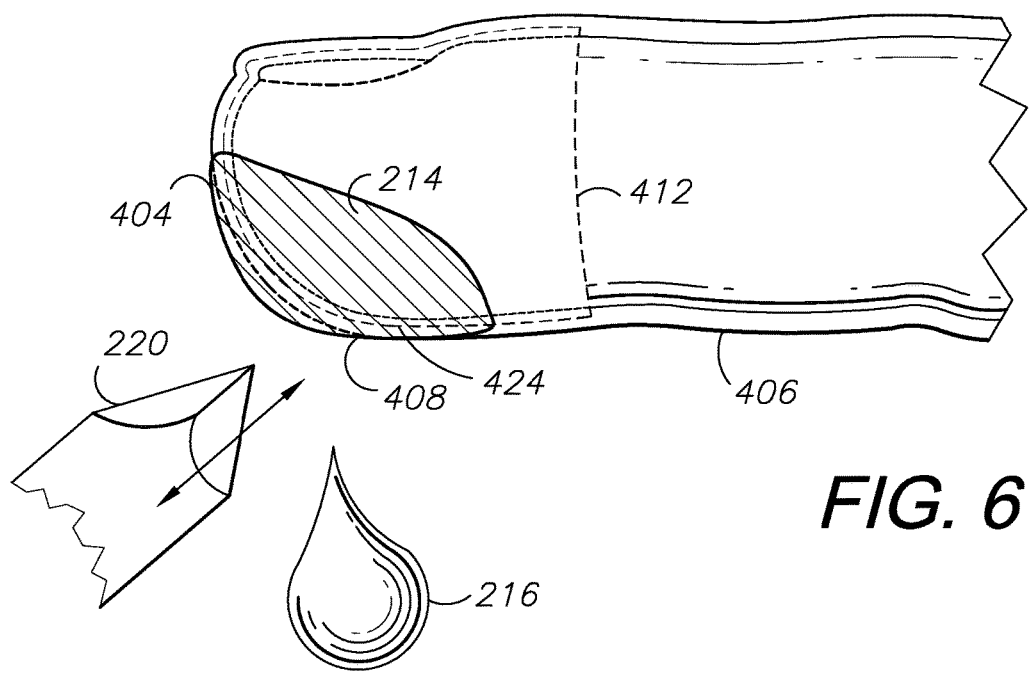
FIG. 6 shows side, elevational view of the finger and blood serum interface having a protective shield mounting a bleb.
Figure 7:
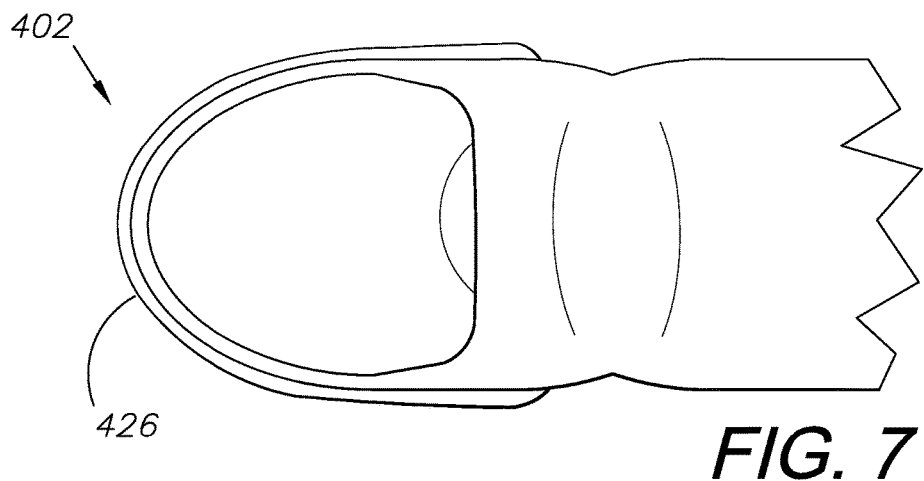
FIG. 7 shows a top, plan view of a finger and a blood serum interface having a puncture-resistant pad mounting a bleb.
Figure 8:
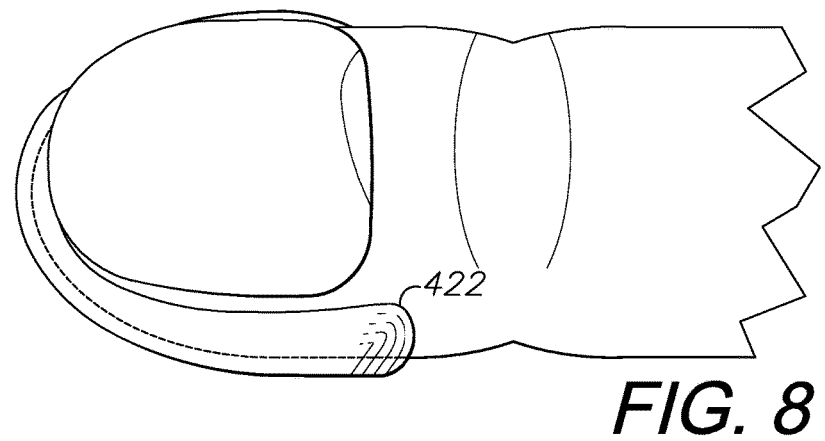
FIG. 8 shows a top, perspective view of the finger and blood serum interface having a puncture-resistant pad mounting a bleb.
Figure 9:
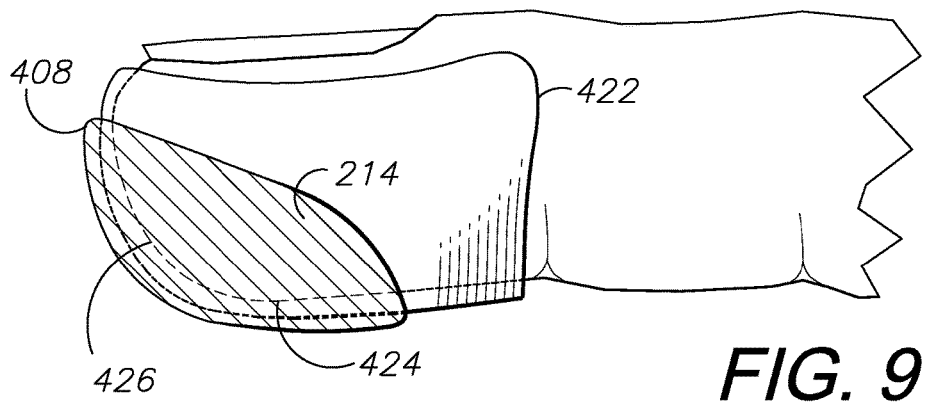
FIG. 9 shows a side, elevational view of the finger and blood serum interface having a puncture-resistant pad mounting a bleb.
Figure 10:
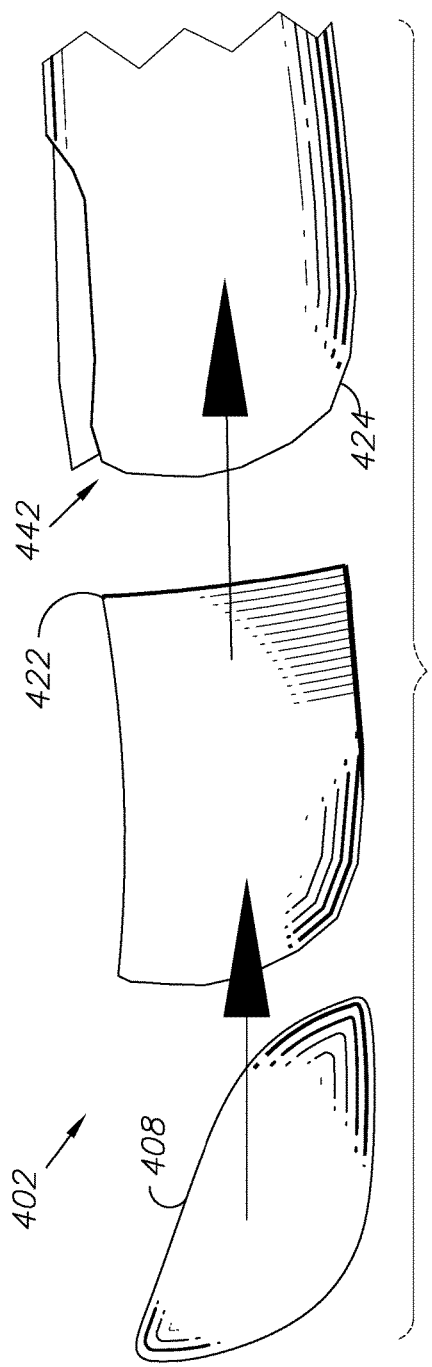
FIG. 10 shows side, elevational, exploded view of a blood serum interface including a bleb, a puncture-resistant pad, and a simulated fingertip.
Figure 11:
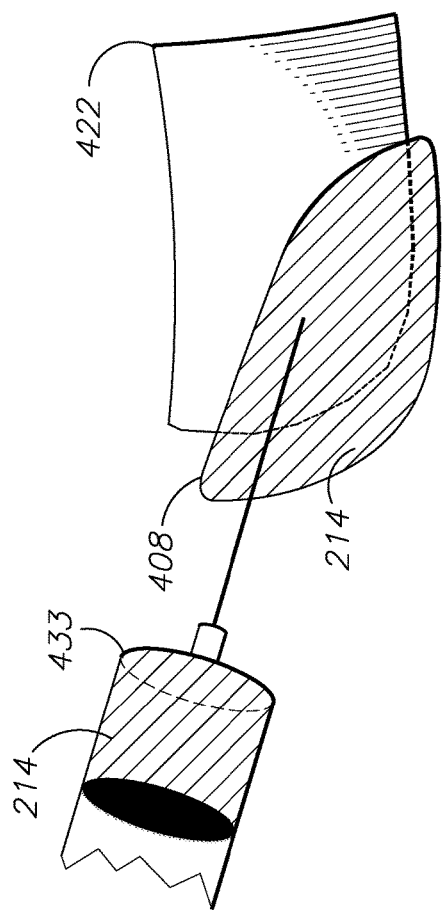
FIG. 11 shows a side, elevational view of filling the bleb of the blood serum interface with simulated blood serum from a syringe.
Figure 14:
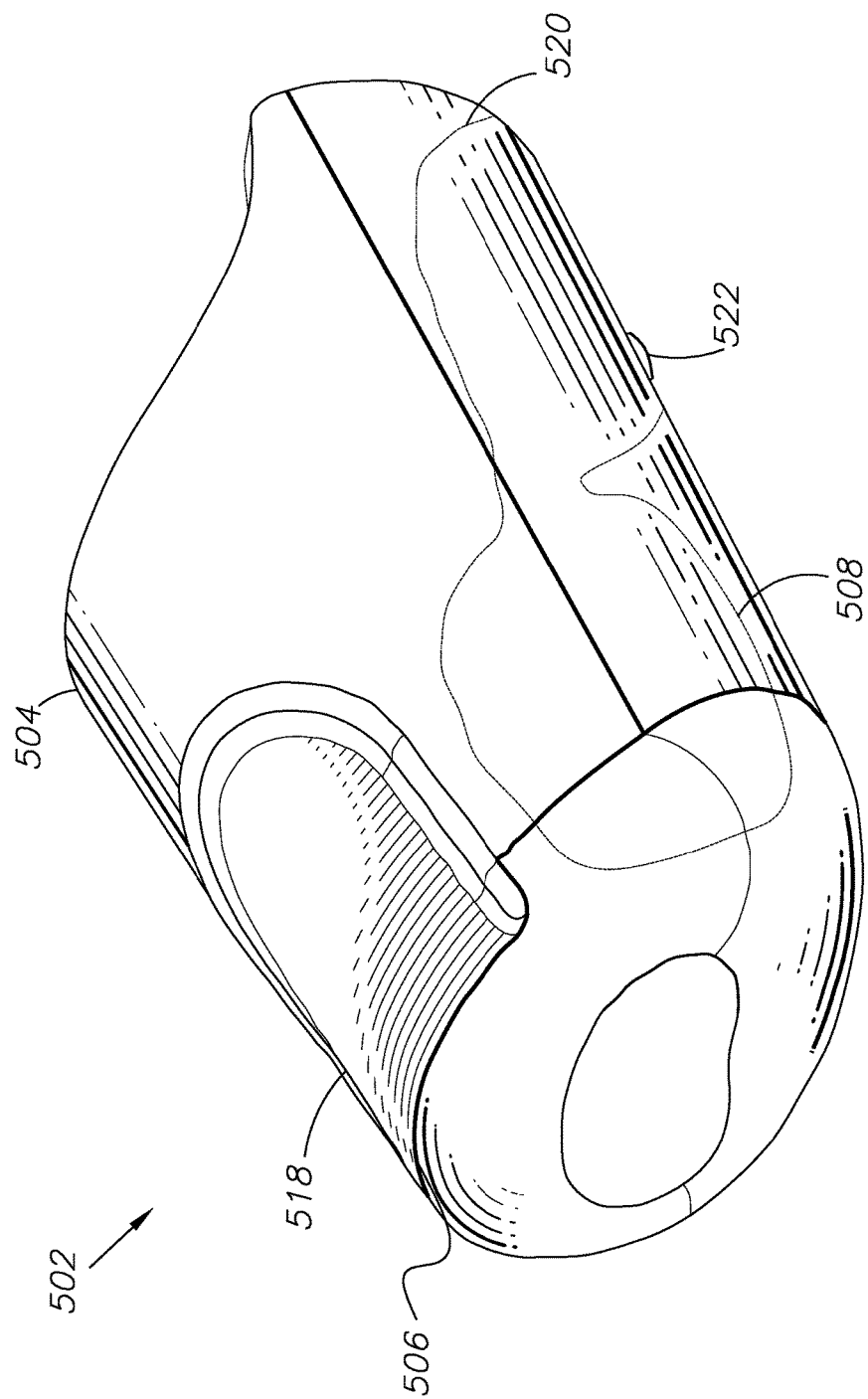
FIG. 14 shows a top, perspective view of an embodiment of a blood serum interface including a simulated finger with two fluid-holding blebs and a common fillable reservoir for glucometer training
Figure 15:
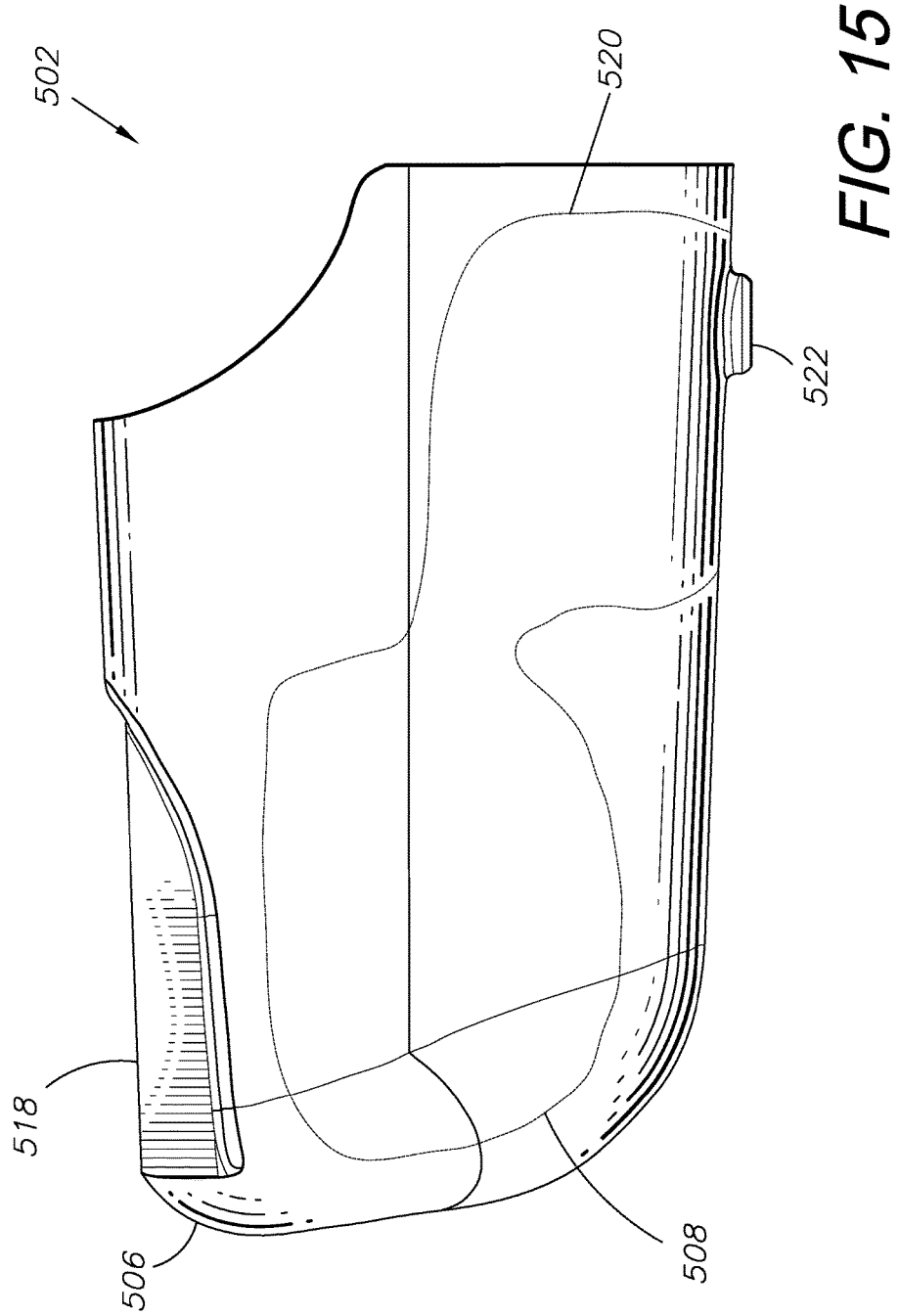
FIG. 15 is a side, elevational view of the blood serum interface including a simulated finger with two fluid-holding blebs and a common fillable reservoir.
Figure 16:
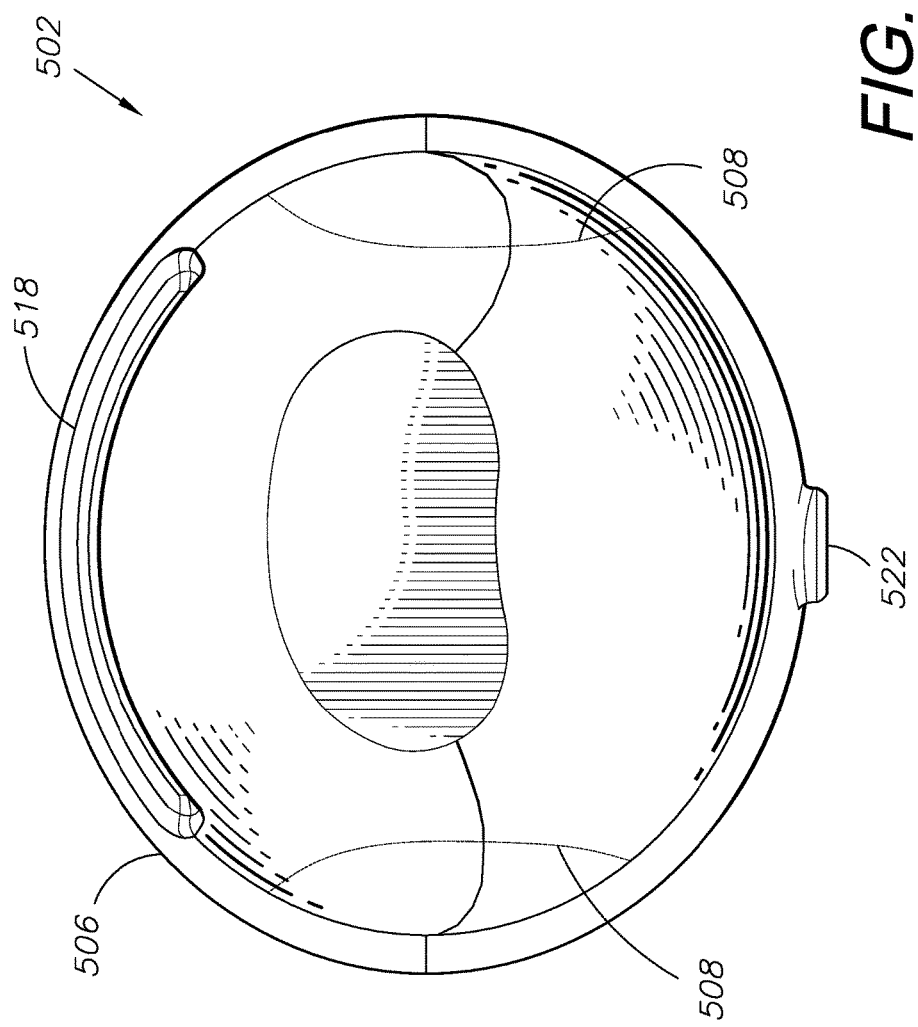
FIG. 16 is a front, elevational view of the blood serum interface including a simulated finger with two fluid-holding blebs and a common fillable reservoir.
Figure 17:
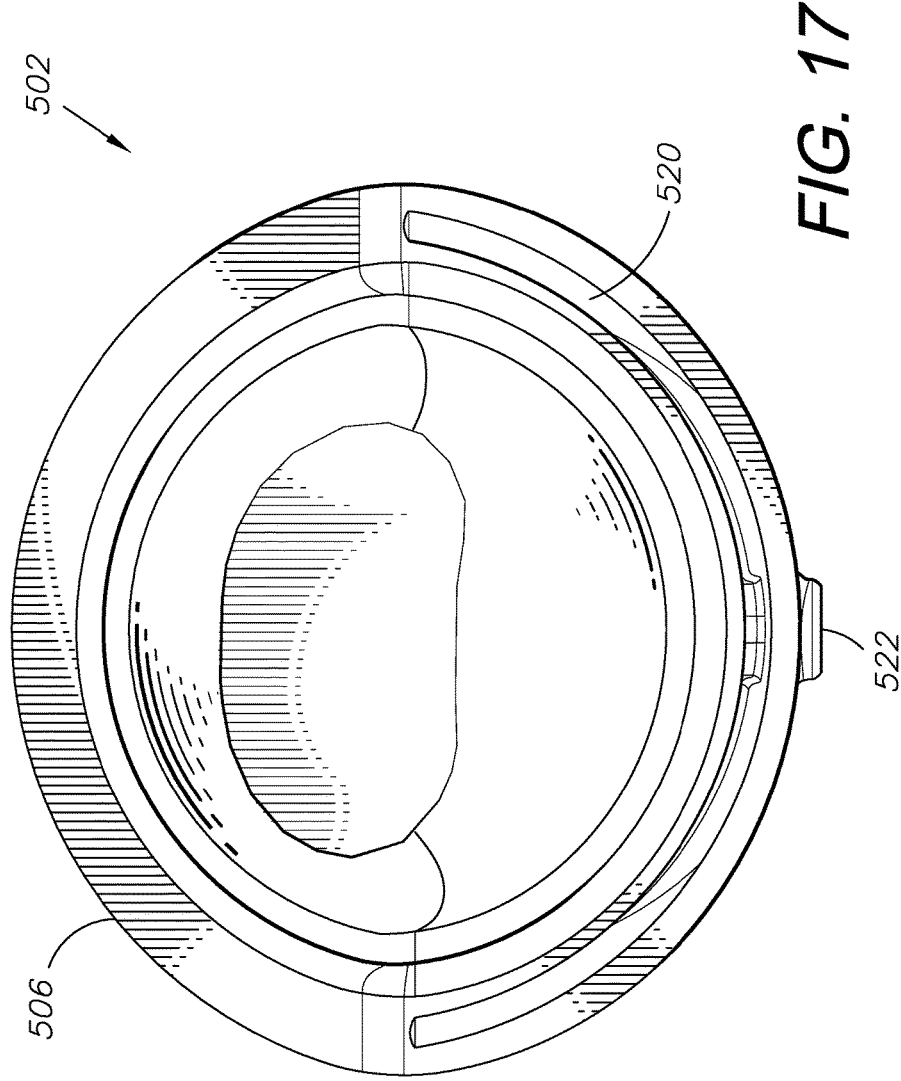
FIG. 17 is a back, elevational view of the blood serum interface including a simulated finger with two fluid-holding blebs and a common fillable reservoir.
Figure 18:
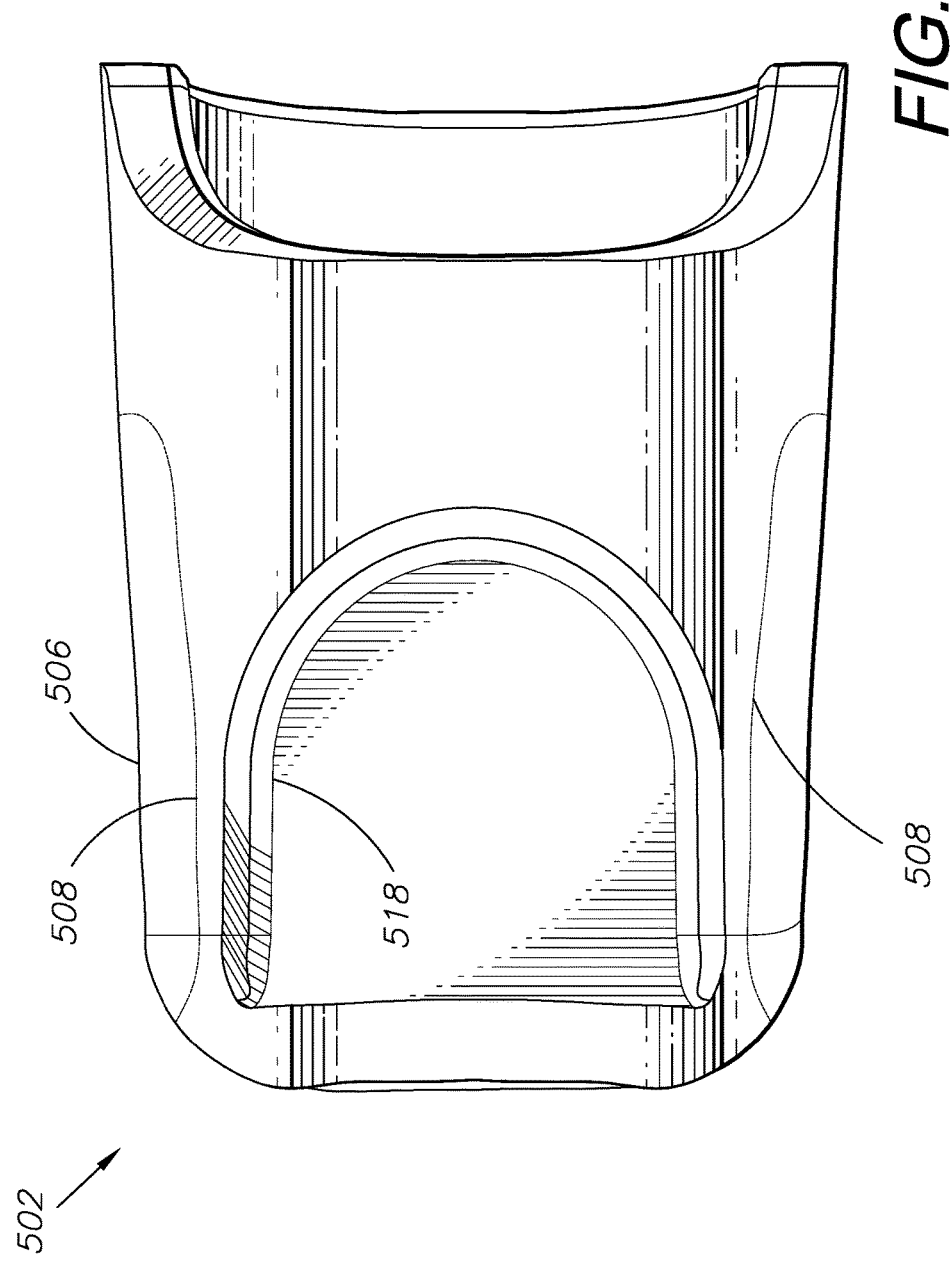
FIG. 18 is a top, plan view of the blood serum interface including a simulated finger with two fluid-holding blebs and a common fillable reservoir.
Figure 19:
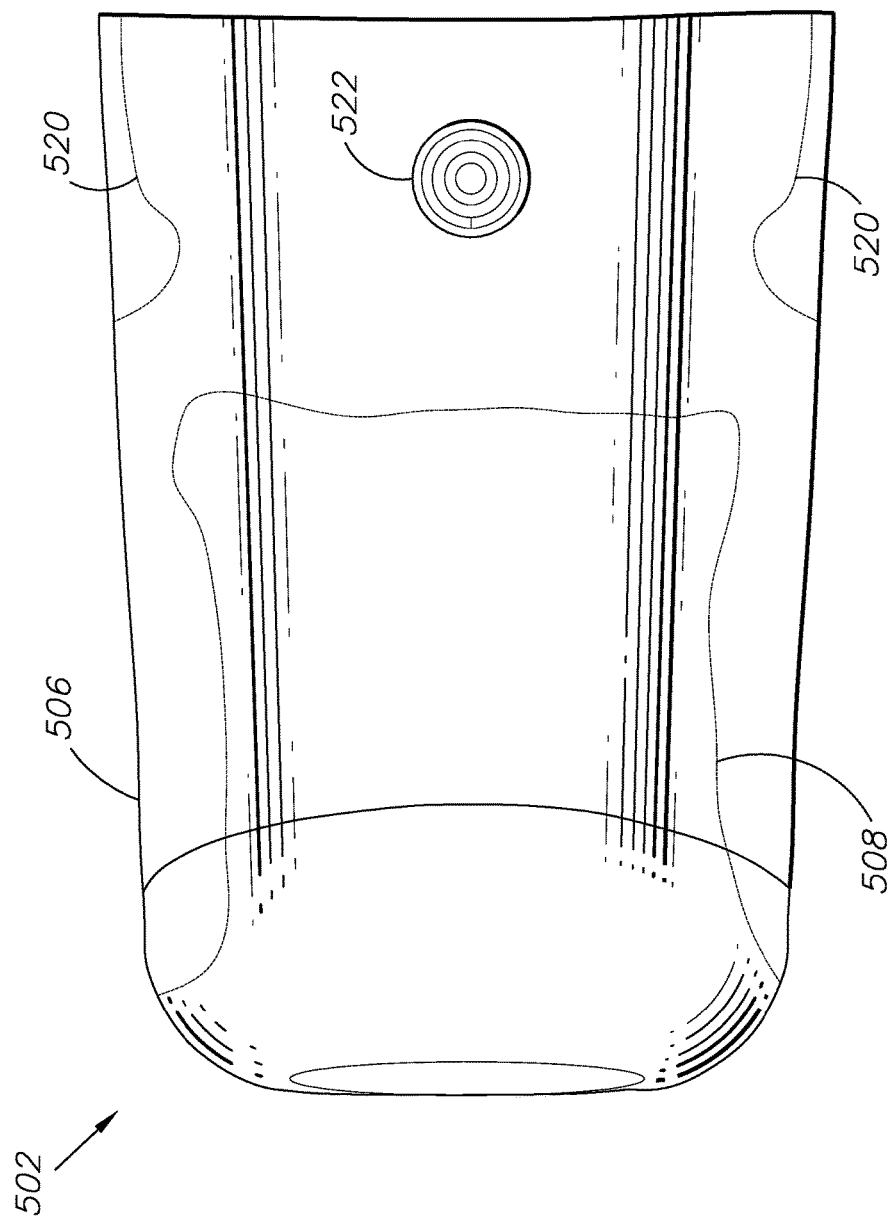
FIG. 19 is a bottom, plan view of the blood serum interface including a simulated finger with two fluid-holding blebs and a common fillable reservoir.
Figure 20:
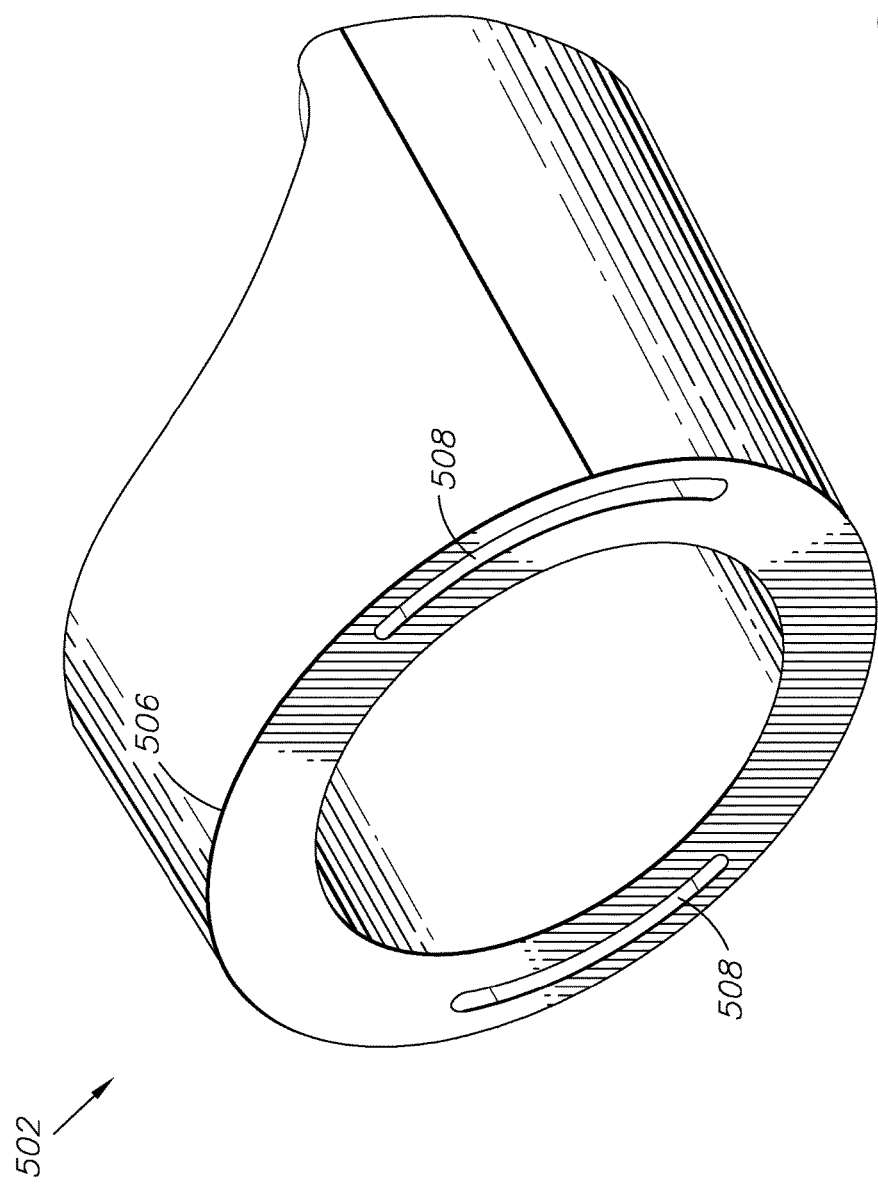
FIG. 20 is an XY-plane cross-sectional, top, perspective view of the back portion of the blood serum interface including a simulated finger with two fluid-holding blebs and a common fillable reservoir.
Figure 21:
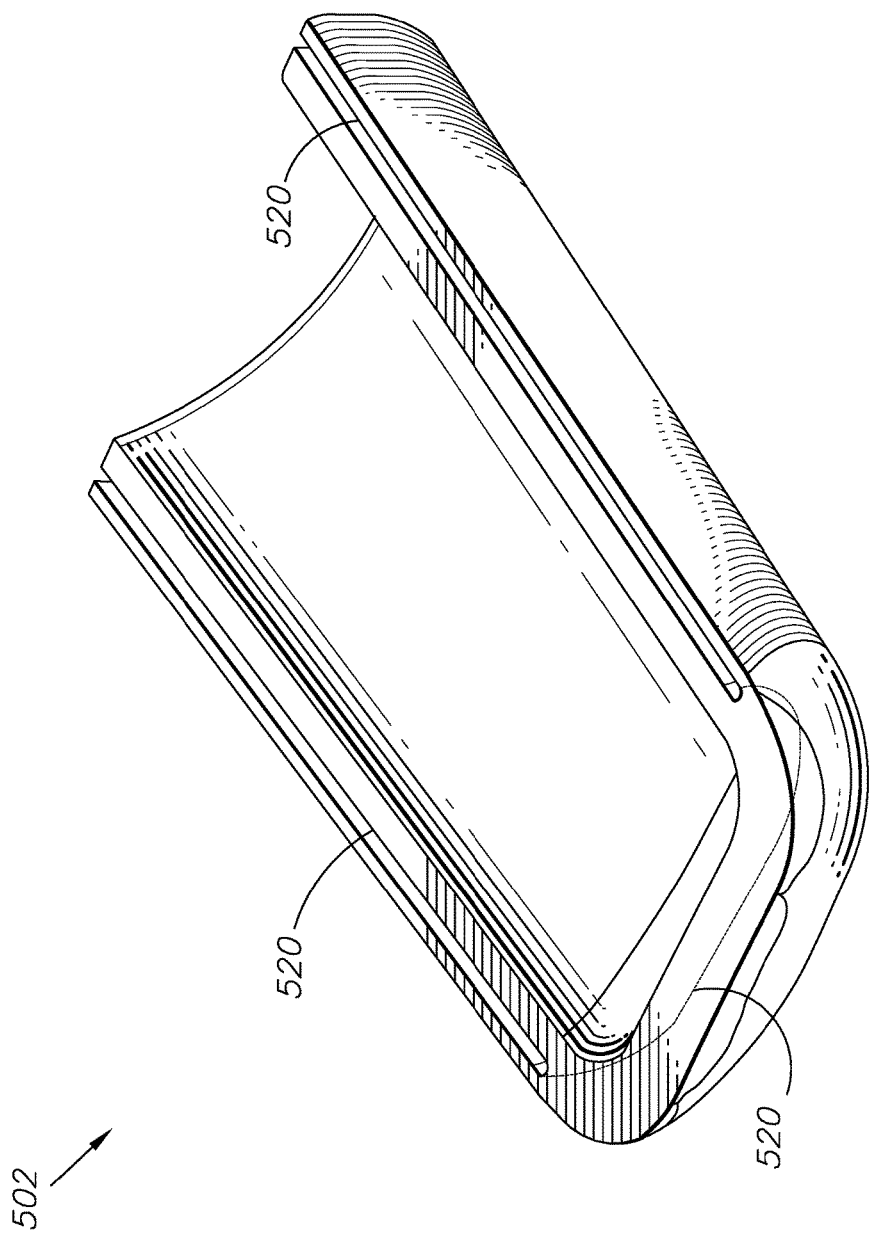
FIG. 21 is an XZ-plane cross-sectional, top, perspective view of the bottom portion of the blood serum interface including a simulated finger with two fluid-holding blebs and a common fillable reservoir.
Figure 22:
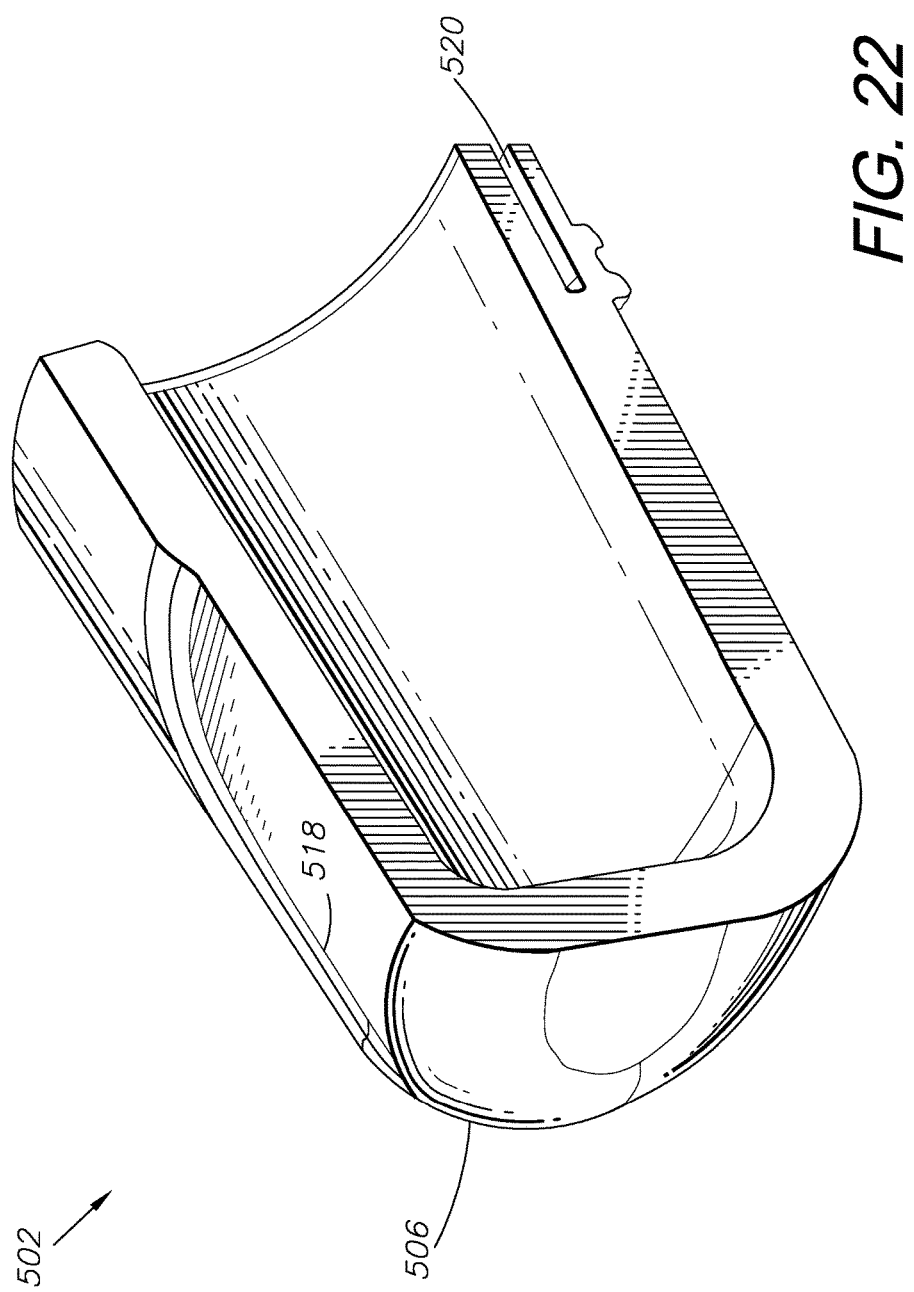
FIG. 22 is a YZ-plane cross-sectional, top, perspective view of one side of the blood serum interface including a simulated finger with two fluid-holding blebs and a common fillable reservoir.
Figure 23:
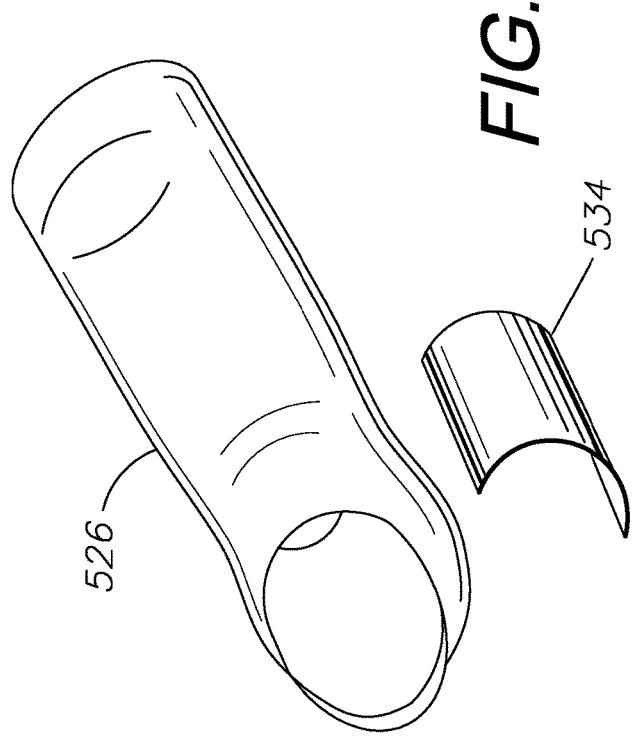
FIG. 23 shows a perspective view of a protective shield for placement over a finger and under the blood serum interface.
Figure 24:
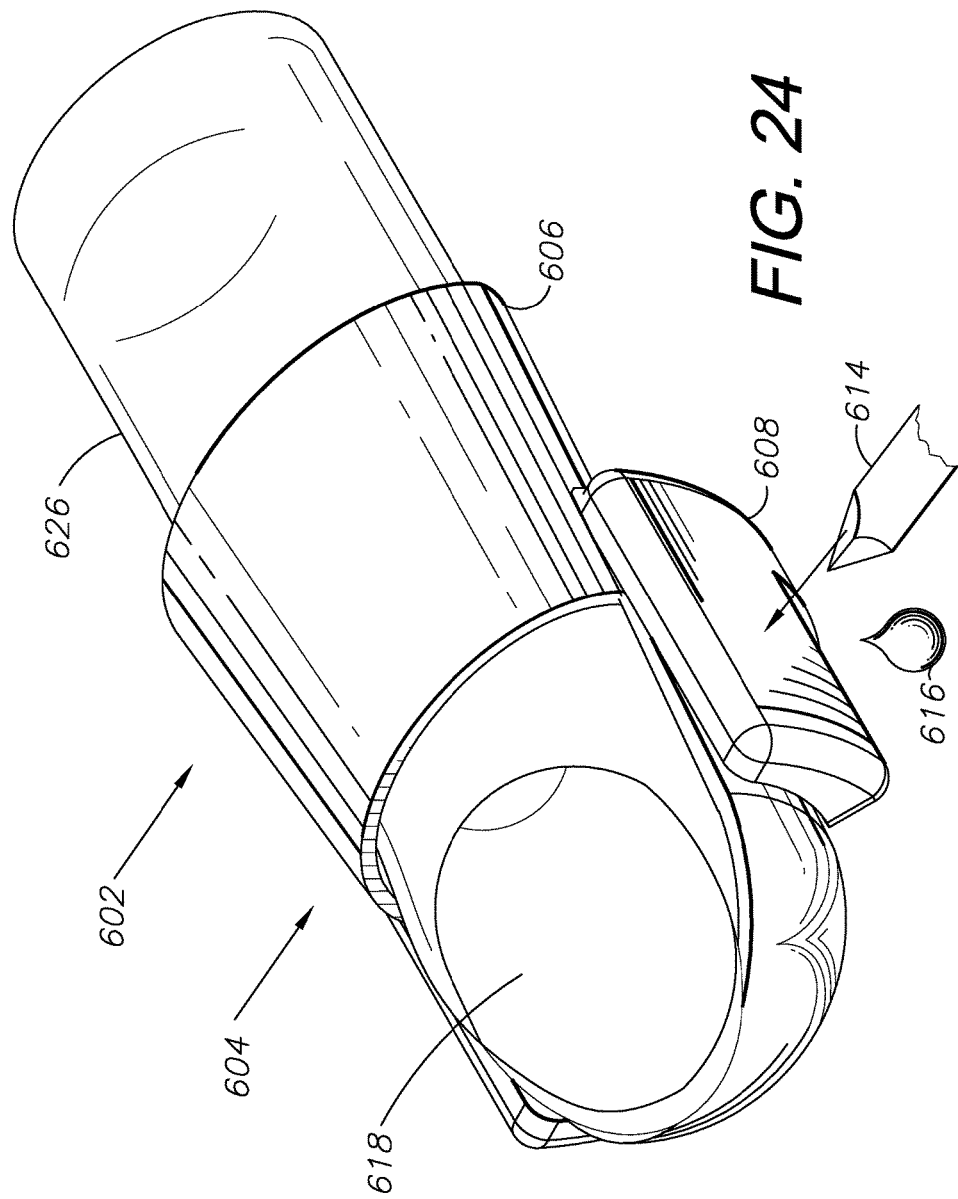
FIGS. 24-30 show another embodiment of a blood serum interface including a finger splint mounting two fluid-holding blebs and a common fillable reservoir for glucometer training
Figure 25:
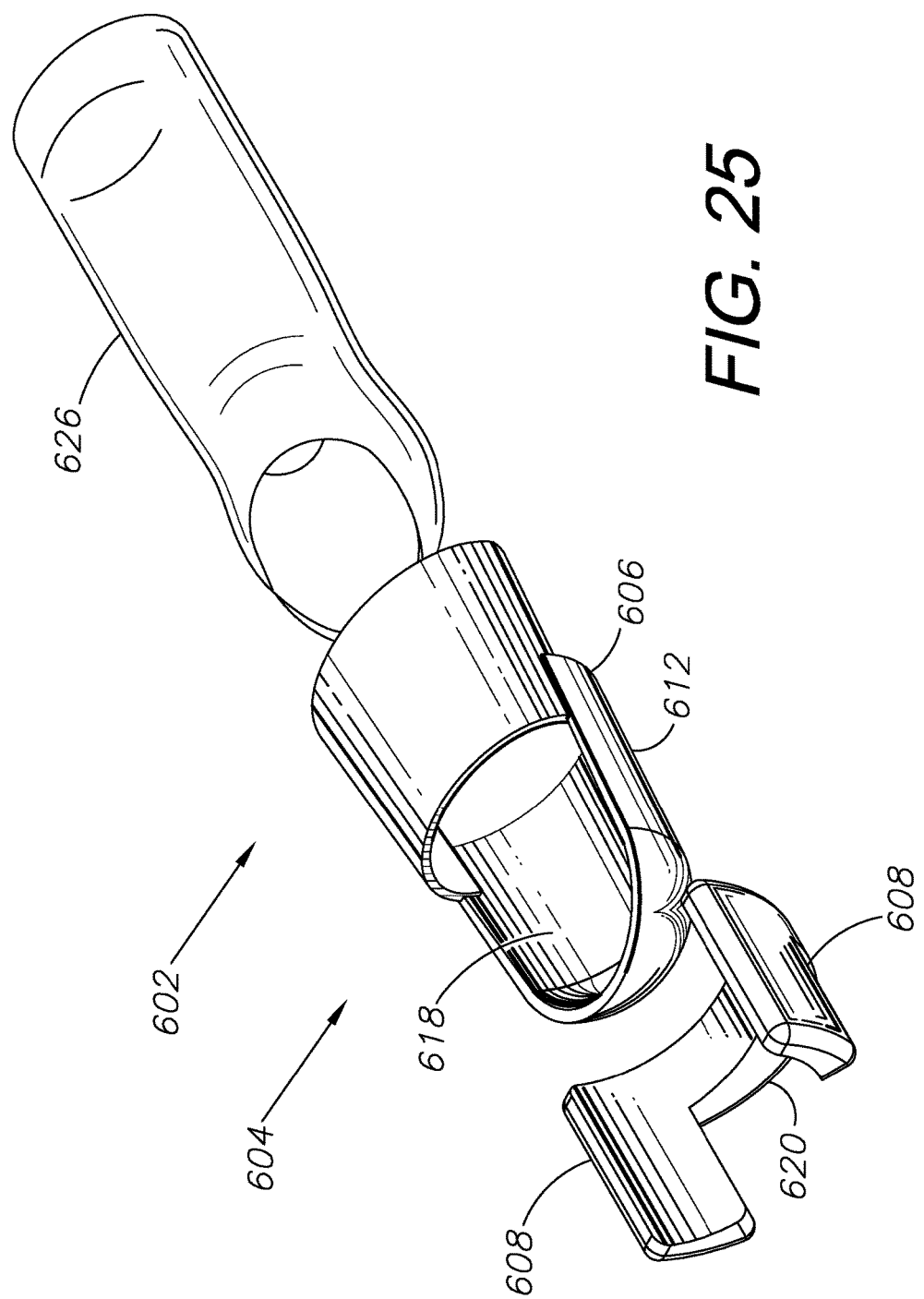
Figure 26:
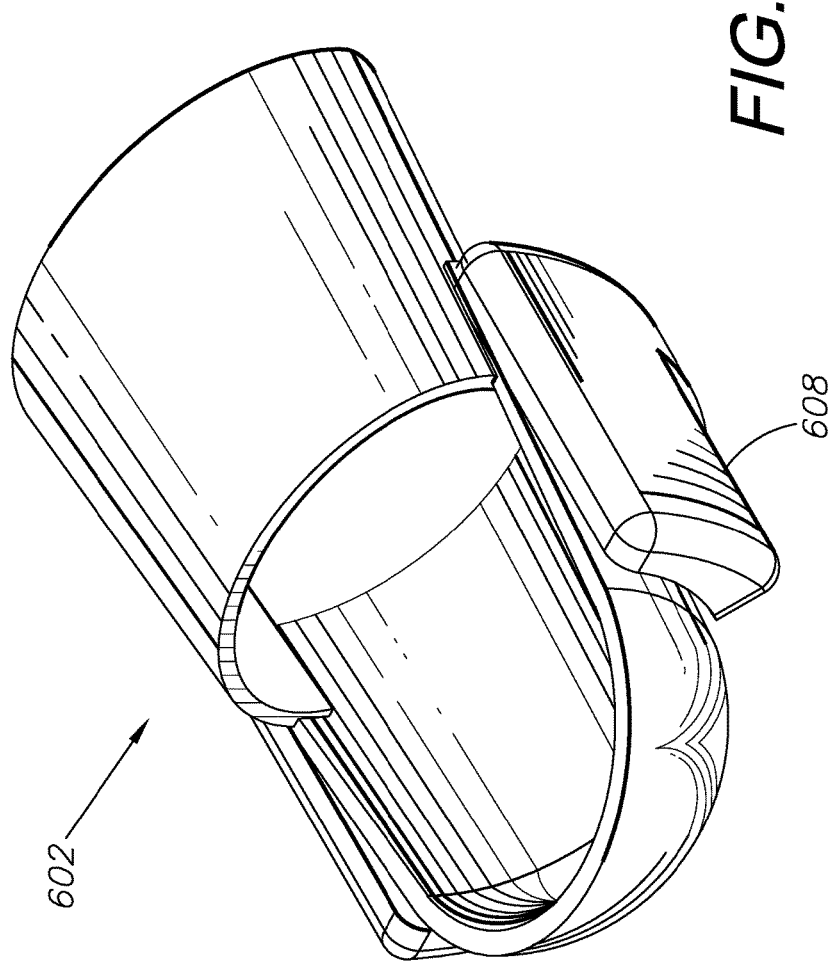
Figure 27:
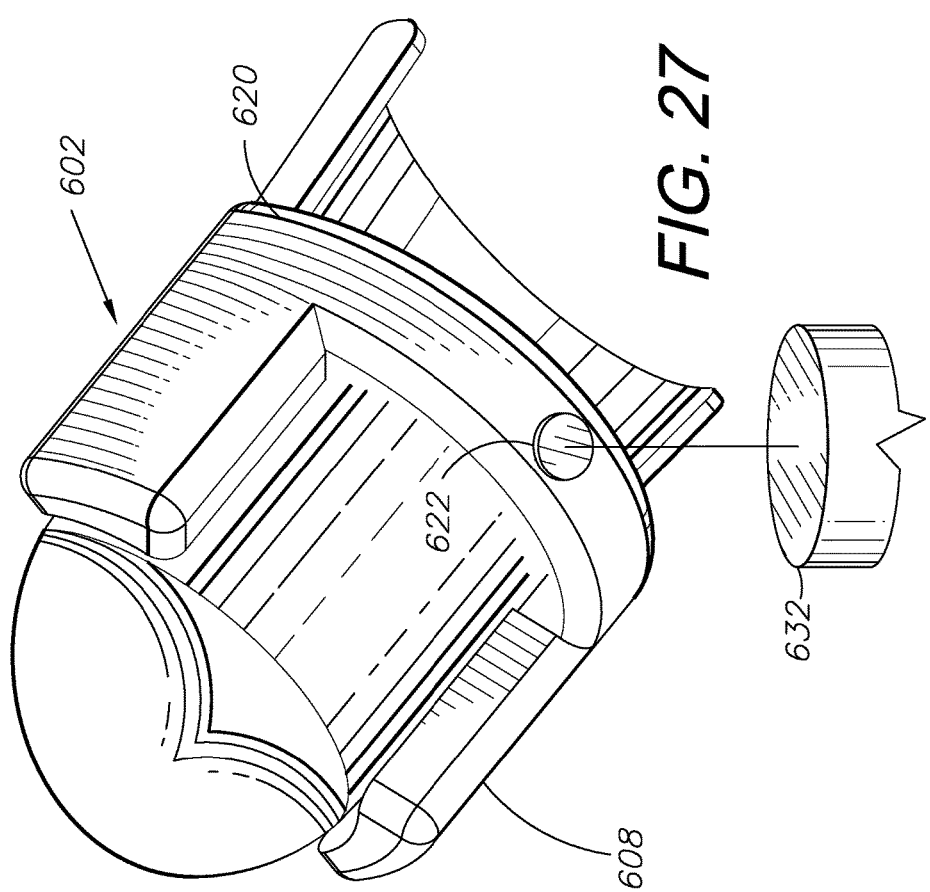
Figure 28:
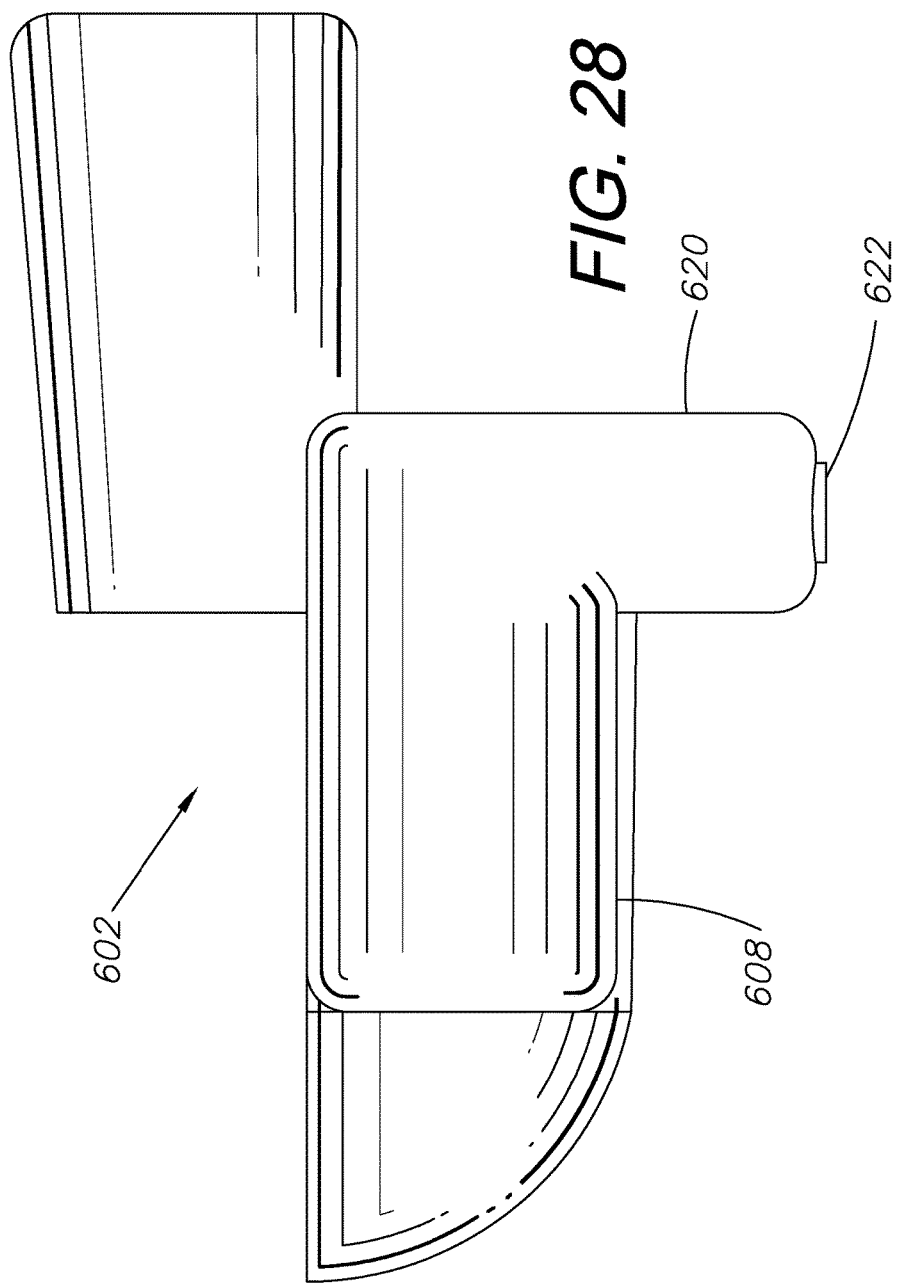
Figure 29:
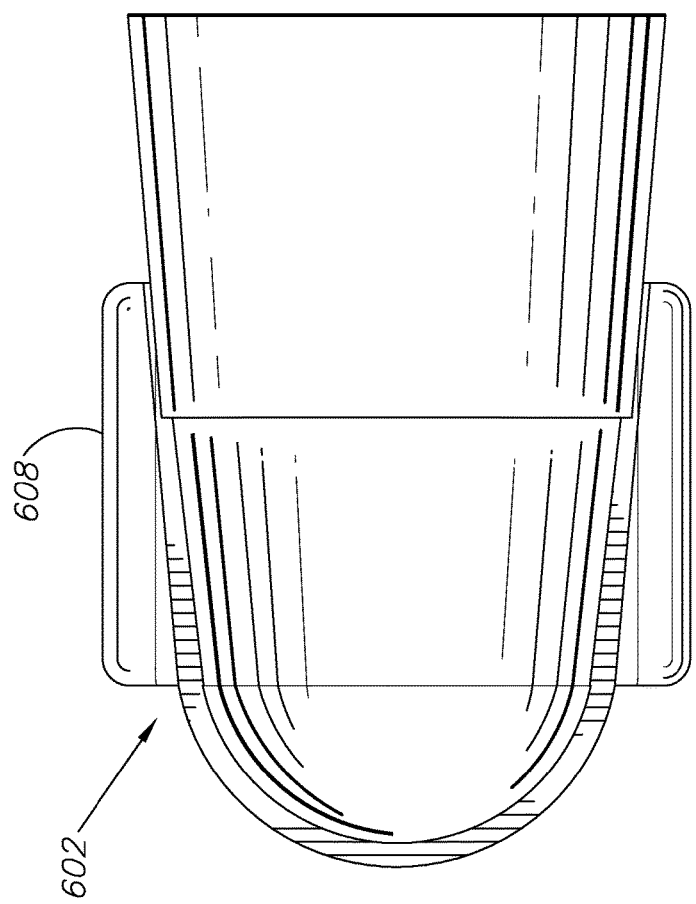
Figure 30:
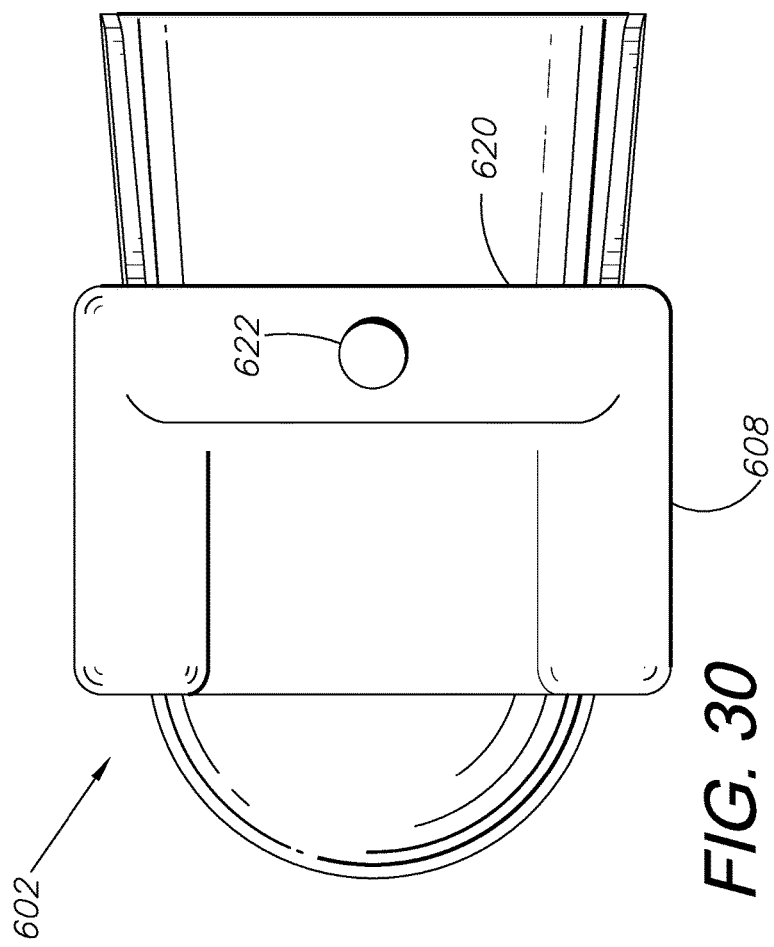
Figure 31:
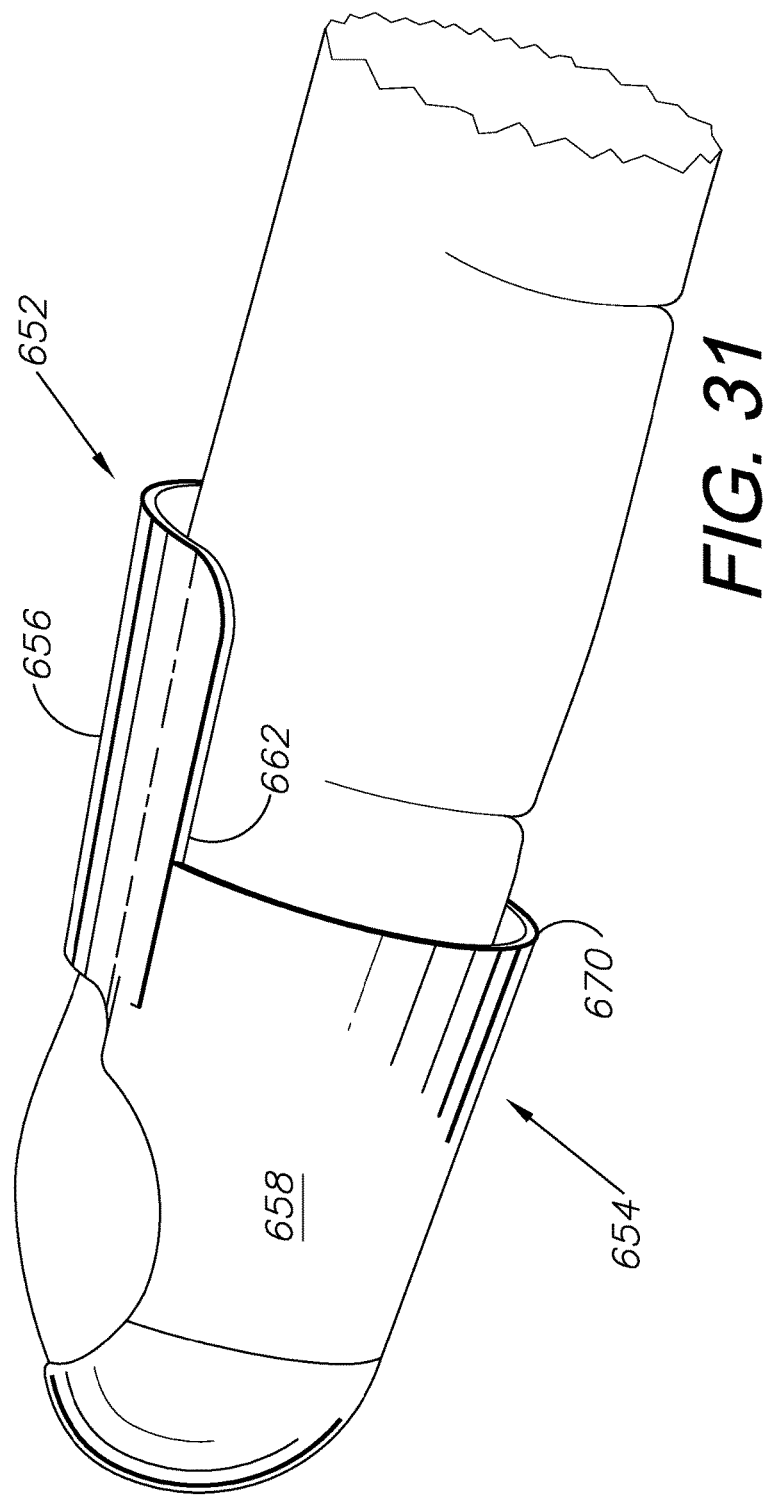
FIGS. 31-35 show an alternative embodiment of a blood serum interface including a finger splint mounting one fluid-holding bleb and a fillable reservoir for glucometer training
Figure 32:
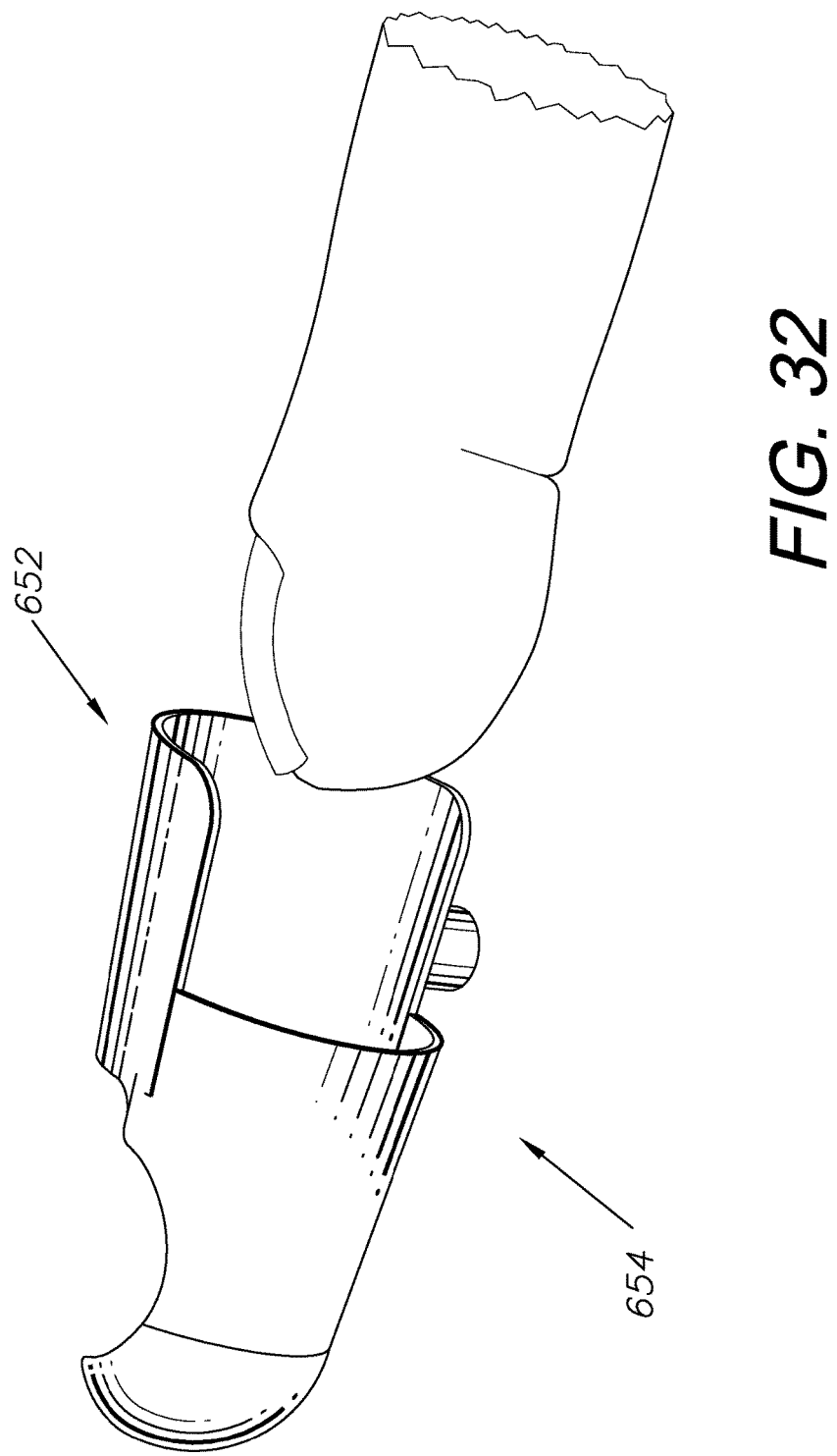
Figure 33:
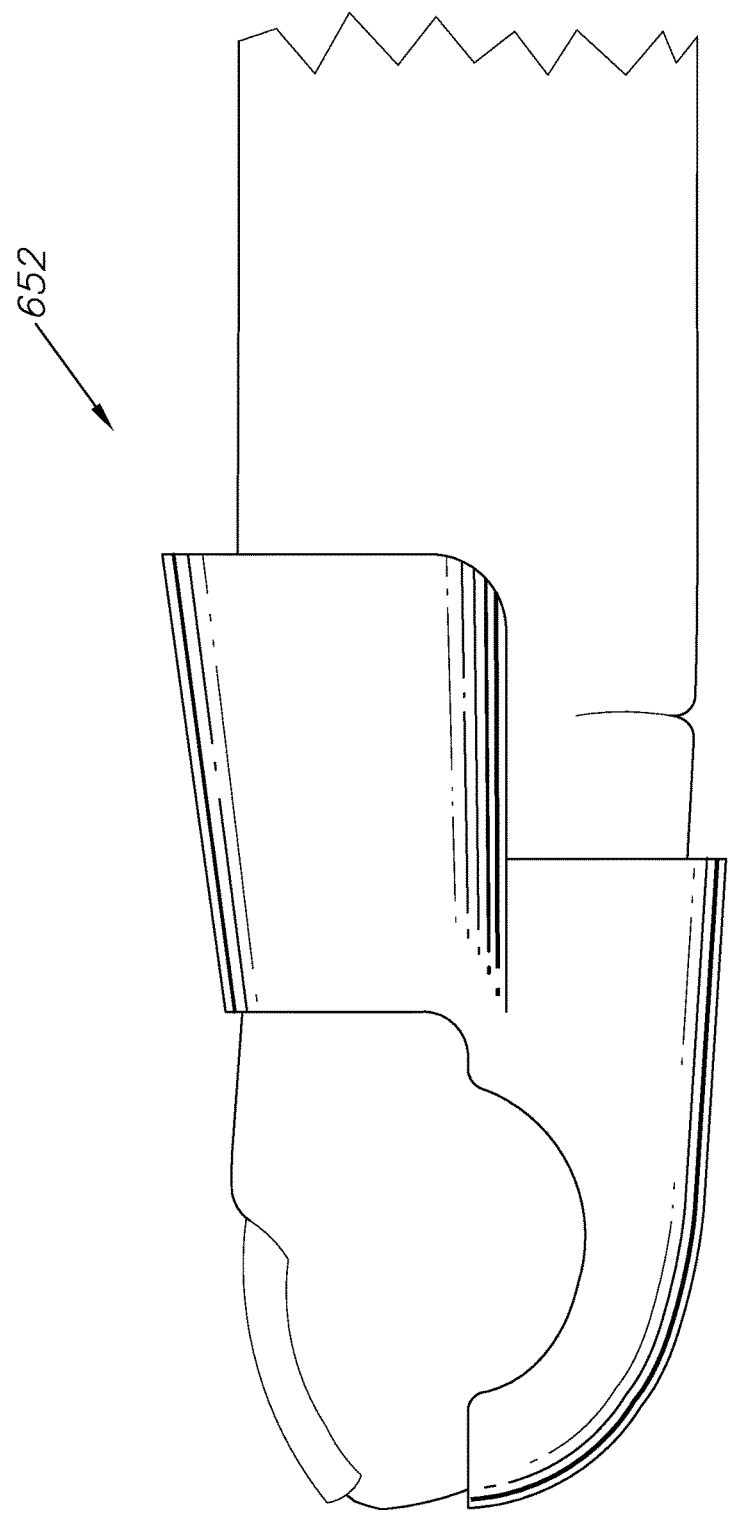
Figure 34:
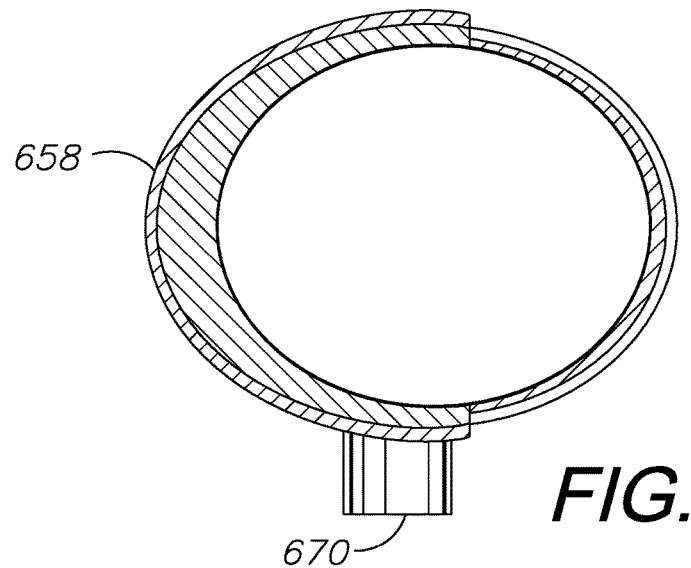
Figure 35:
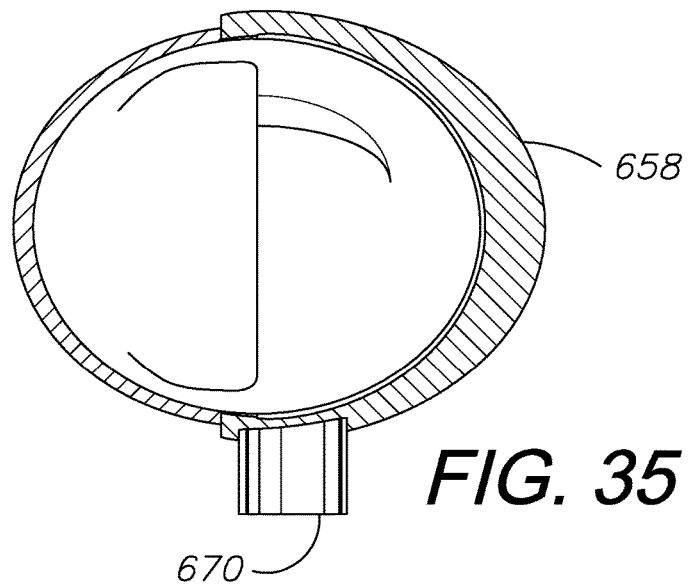
Figure 36:
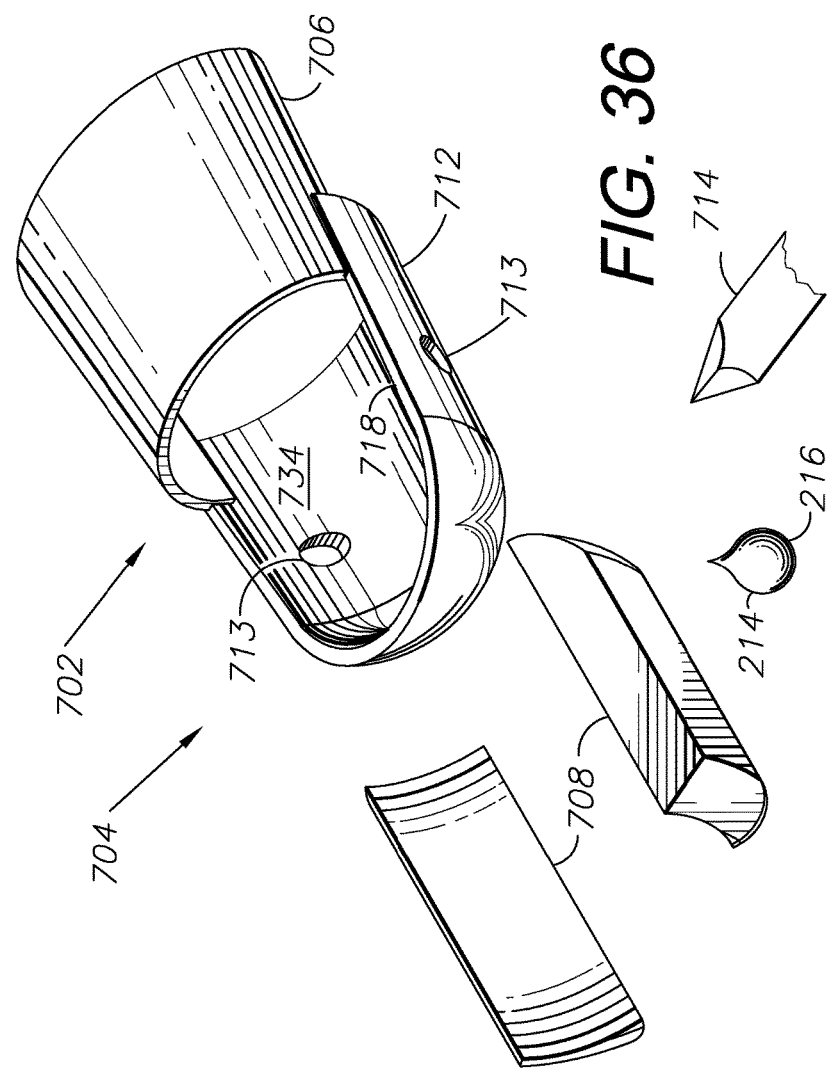
FIGS. 36-38 show another alternative embodiment of a blood serum interface including a finger splint which mounts two fluid-holding blebs and has perforations for filling the blebs from inside the finger splint.
Figure 37:
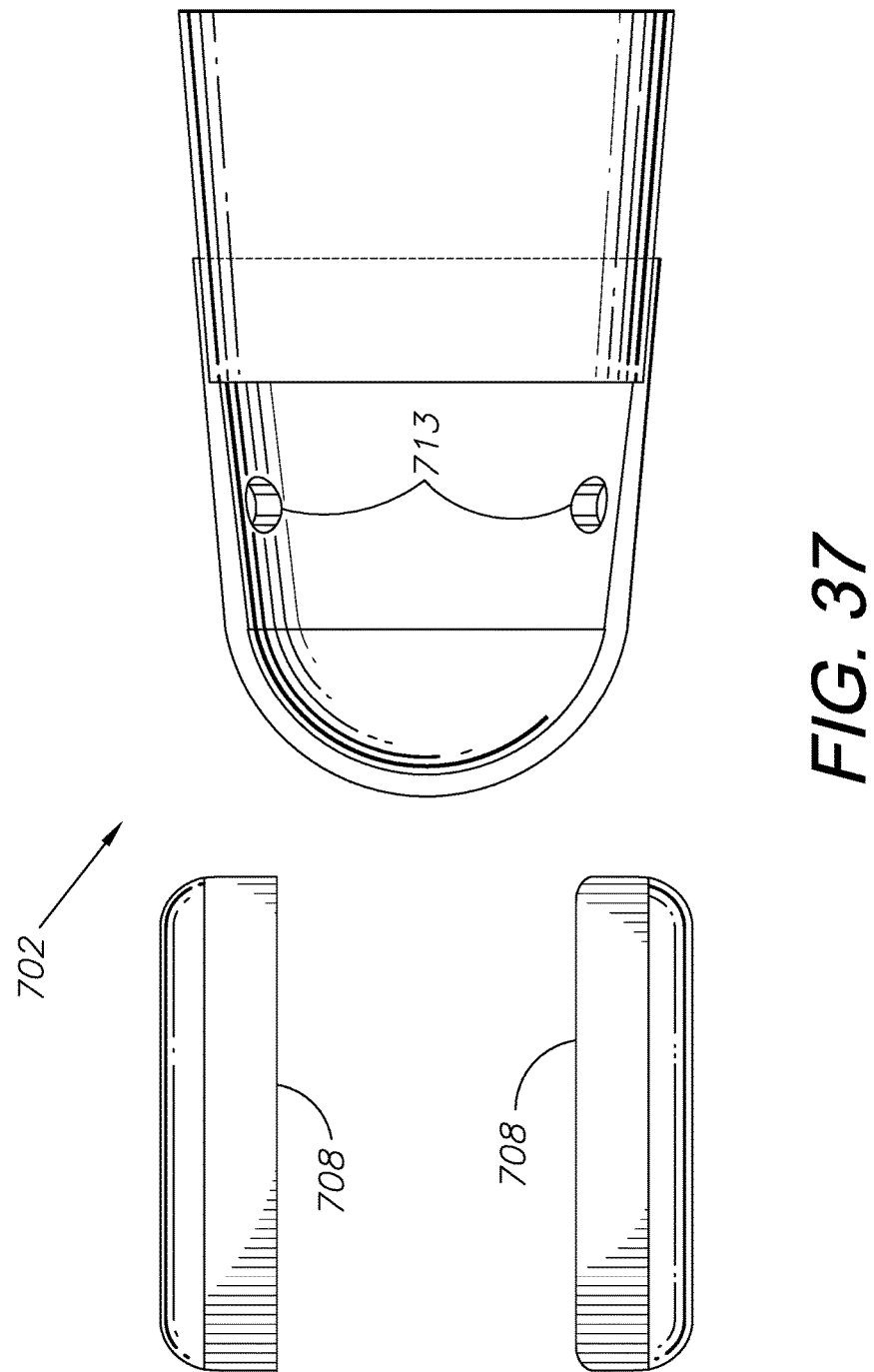
Figure 38:
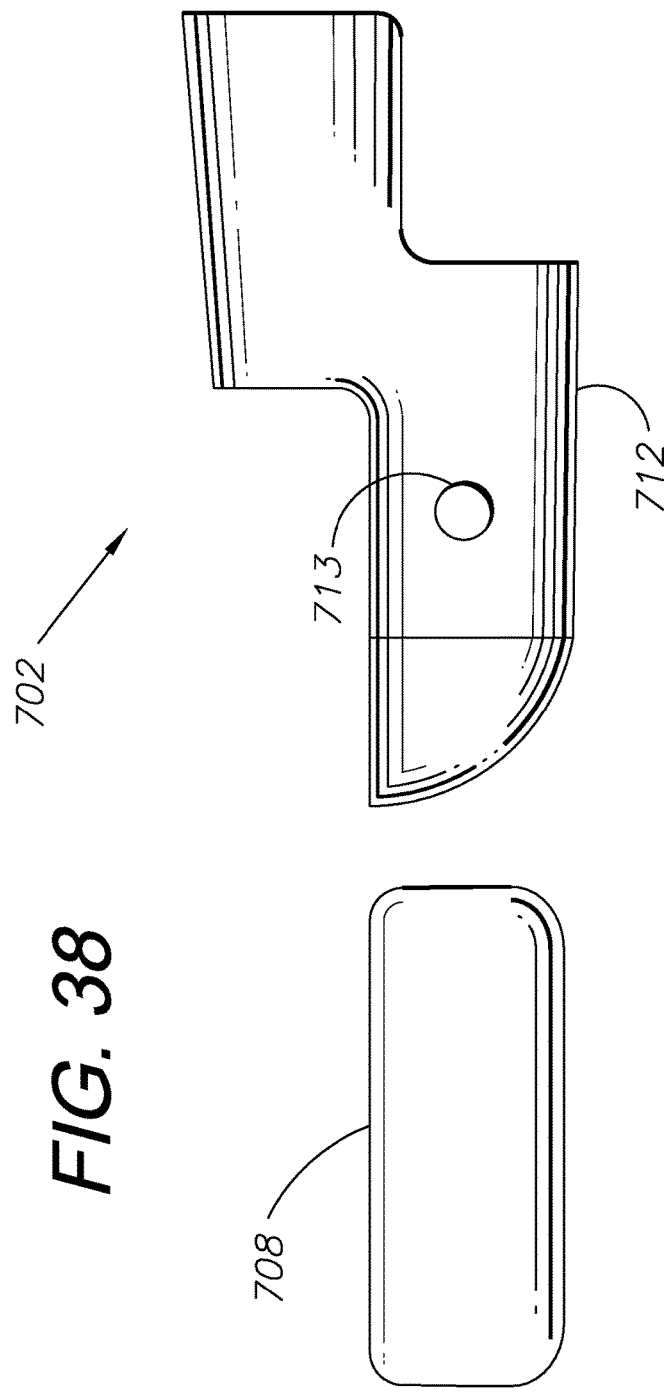
Figure 39:
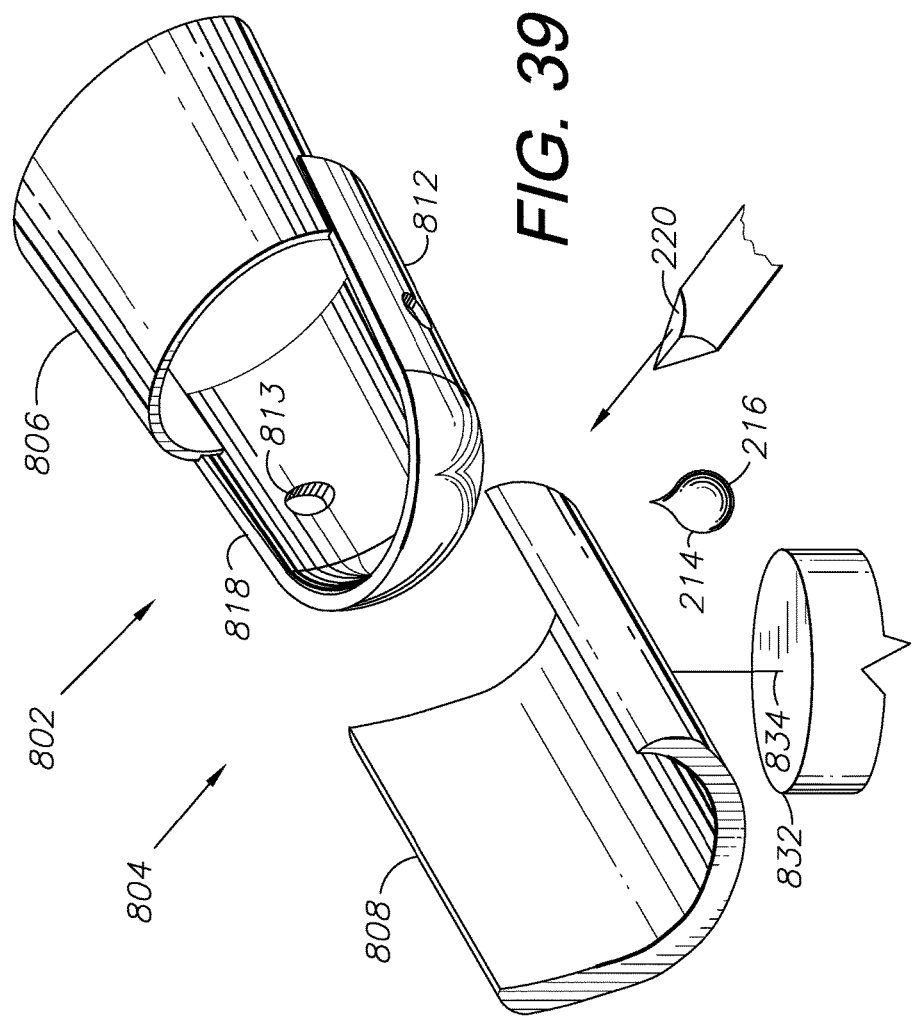
FIG. 39 shows an embodiment of a blood serum interface including a finger splint which mounts a fluid-holding bleb and has perforations for filling the bleb from inside the finger splint.
Figure 40:
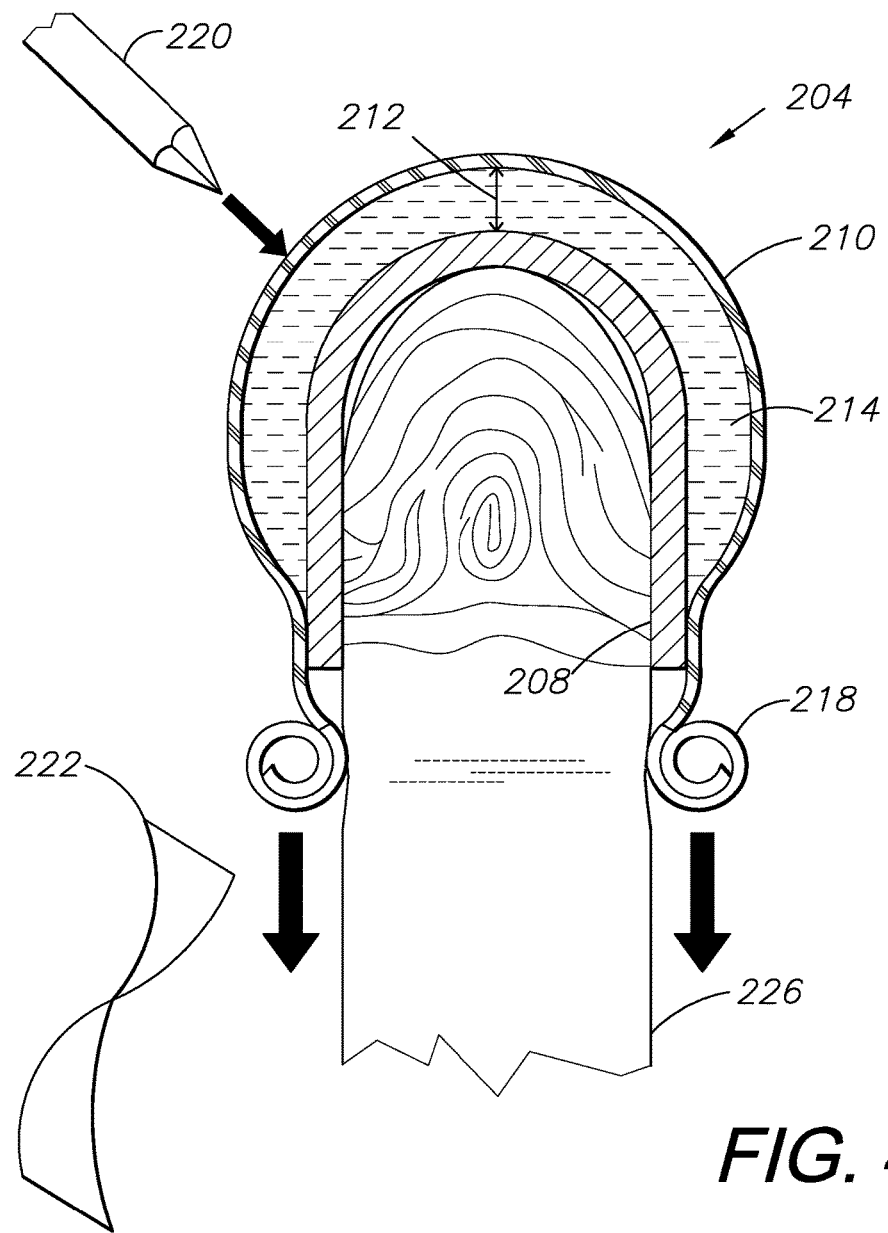
FIGS. 40-43 show another embodiment of a blood serum interface including a thimble and a finger cot configured for holding simulated blood serum in the intermediate space between the thimble and the finger cot.
Figure 41:
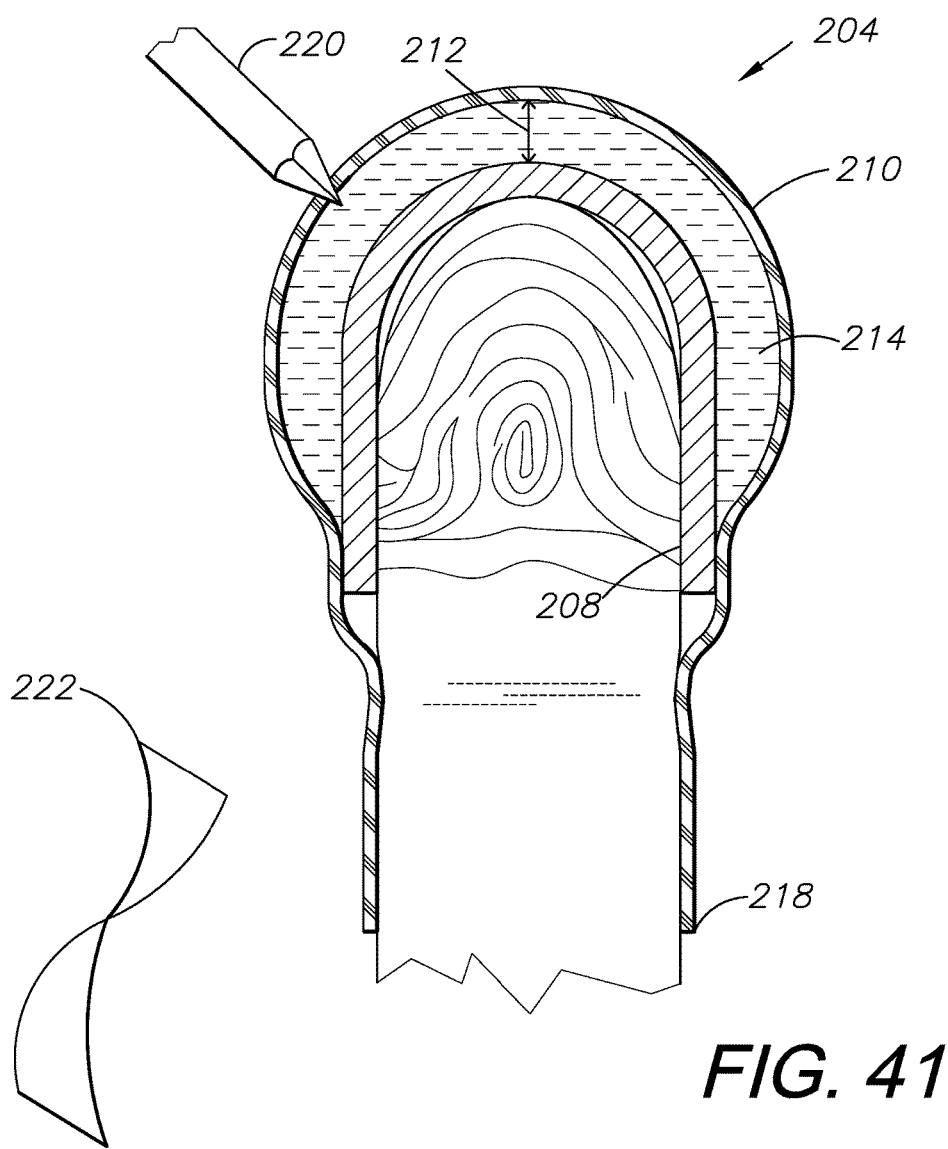
Figure 42:
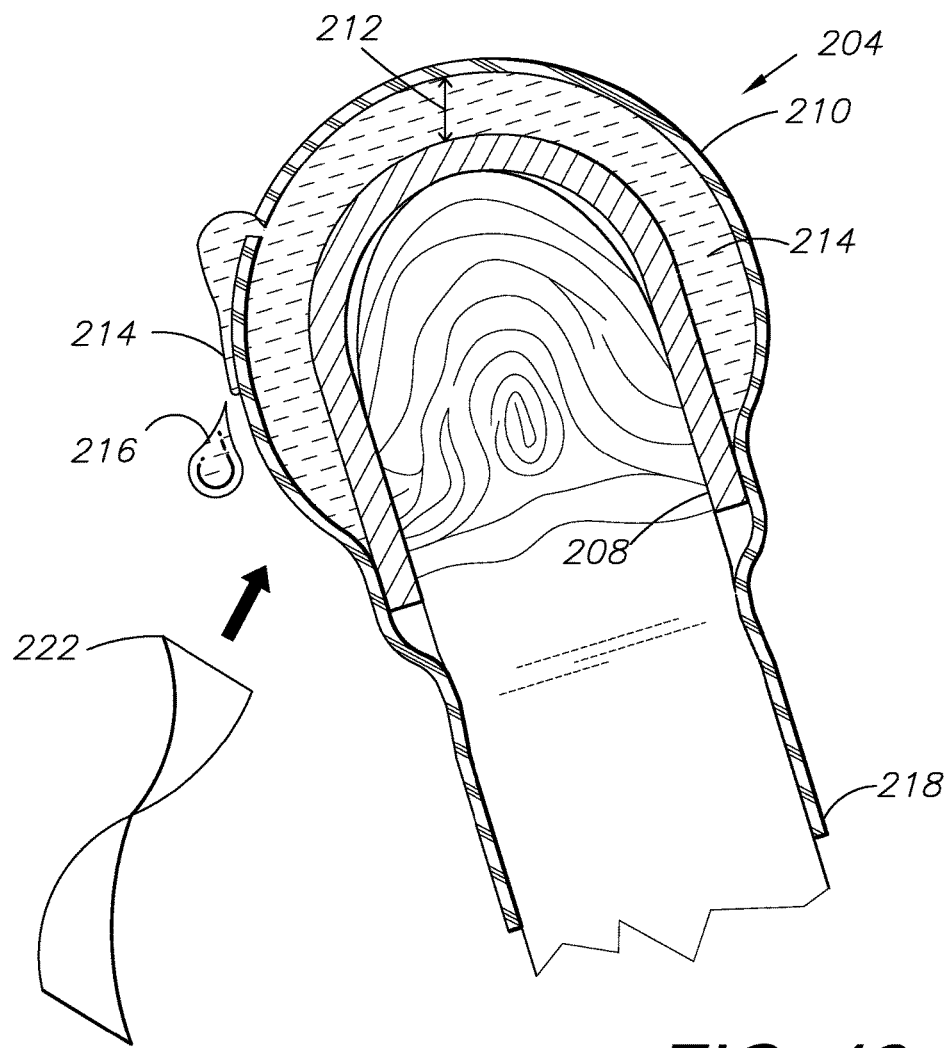
Figure 43:
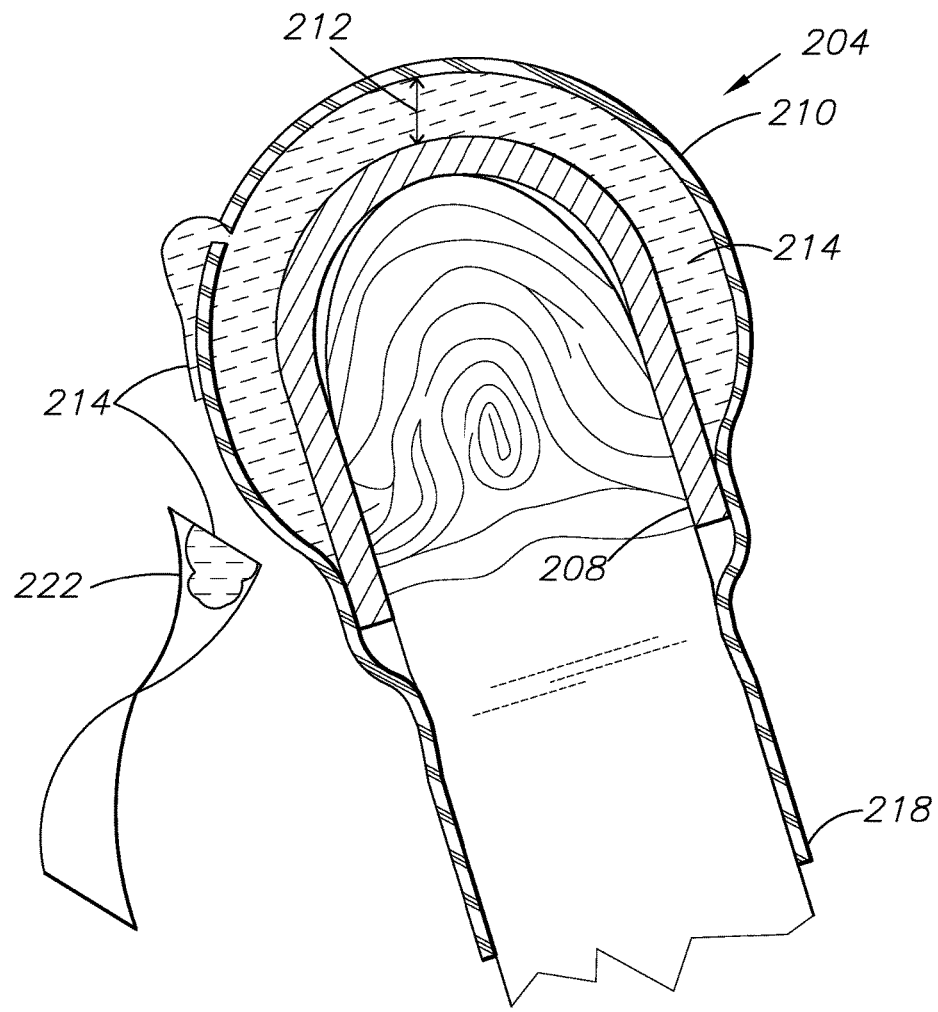

An embodiment of a glucometer simulation is shown in FIGS. 5-13. The glucometer training system 402 includes a blood serum interface 404 which mounts a bleb 408 and is configured for placement over a fingertip 426. The bleb 408 is configured for being filled with simulated blood serum 214 using a syringe 432. The interface 404 most commonly includes a thimble or fingertip shield 412 to protect the underlying part of the fingertip 426 from puncture, as shown in FIGS. 5-6. In this embodiment, a rubber or latex-like finger cot 406 is configured to fit around the thimble or finger shield 412 and the bleb 408. Alternatively, as shown in FIGS. 7-9, a soft, protective gel or latex pad 422, rather than a thimble or protective shield, can mount a bleb 408 and be placed on the volar portion 424 of the fingertip 426 to protect the fingertip 426 from puncture. Another embodiment, shown in FIGS. 10-13, includes placing a pad 422 and mounted bleb 408 on the volar portion 424 of a simulated fingertip 442 and placing the simulated fingertip 442 over a patient/subject's fingertip 426. The bleb 408 is designed to be filled with semi-viscous fluid 214 including a predetermined amount of glucose and protein or vegetable solutions. This allows a student to puncture the bleb 408 with a clinical lancet 220, obtain a droplet 216 of blood serum 214 on a test tape 222, and insert the test tape 222 into a clinical glucometer 252, getting a blood glucose reading.

FIGS. 14-23 show a preferred embodiment of a glucometer training system 502 having a blood serum interface 504 including a simulated finger 506 configured for placement over a manikin or actual finger 526. In this embodiment, simulated blood serum 214 can be inserted into a common reservoir 520 of the simulated finger 506 through a fill site 522. The common reservoir 520 in this embodiment is connected to two blebs 508, one on the ulnar side and one on the radial side of the simulated finger 506. After the common reservoir 520 is filled with simulated blood serum 214, pressure can be applied to the reservoir 520 to fill the blebs 508 with the simulated blood serum 214. This embodiment of a blood serum interface 504 is configured to look like a real finger to better simulate blood glucose testing, including a nail portion 518 which helps with proper orientation of the blood serum interface 504 on the mannequin or real finger 526. Once the blebs 508 are filled with simulated blood serum 214 and the interface 504 is placed on a manikin's or simulated patient's finger 526, a student can puncture one of the blebs 508 with a clinical lancet 220 to obtain a droplet 216 of the simulated blood serum 214 as if the student was obtaining a blood droplet from a real patient. The droplet 216 of simulated blood serum 214, in this embodiment, can then be led onto a clinical testing tape 222, and the testing tape 222 can be inserted into a clinical glucometer 252. The simulated blood serum 214, which includes a predetermined amount of glucose and protein or vegetable solution, will give a reading on the clinical glucometer 252. After obtaining a blood glucose level, the student can continue the simulation with treatment as appropriate. Preferably, this embodiment of a blood serum interface 504 includes a protective shield 534, either as a separate piece or molded into the simulated finger 506, to protect the mannequin or actual finger 526 from lancet puncture.

FIGS. 24-30 show an alternative embodiment of a blood serum interface 604 configured to be used as part of a glucometer training system 602. The interface 604 is configured for placement over a manikin's or simulated patient's finger 626. The interface 604 in this embodiment includes a layer of protective material 612, which may comprise of a modified finger splint 606, such as a Stax-type DIP splint for extensor tendons. The protective layer 612 may consist of metals, hard plastics, and/or other materials capable of protecting a finger 626 from being cut. In this embodiment, the finger splint 606 is modified to mount a resealable membrane configured to form blebs 608 and a common reservoir 620 and to hold simulated blood serum 214. The common reservoir 620 is configured to be filled with simulated blood serum 214 through a fill site 622 with a needle and syringe 632. Once the reservoir 620 is filled with simulated blood serum 214, pressure can be applied to the reservoir 620, pushing blood serum 214 into the blebs 608. The blebs 608 are configured for puncture by a lancet 220 to obtain a droplet 216 of blood serum 214. The droplet 216 of blood serum 214 can then be tested with a test tape 222 and glucometer 252. The finger splint 606 also has an open nail portion 618 to help with orientation of the interface 604 on the patient/subject's finger 626 and to make the simulation more realistic.

Alternatively, a glucometer training system 652 may include a blood serum interface 654 with only one bleb 658 and a separate filling reservoir 670, as shown in FIGS. 31-35. This interface 654 may only have protective material 662 covering the one side of a simulated patient's or mannequin's finger which mounts the single bleb 658. The interface 654 also includes hard material 662 on the opposite side of the finger from the bleb 658 to provide a cantilever effect. This embodiment could be achieved by attaching a bleb 658 with a fillable reservoir 670 to the bottom of a Stax-type splint 656 and placing the splint 656 on a patient/subject's finger turned 90 degrees.

FIGS. 36-39 show alternative embodiments of glucometer training systems 702, 802 with blood serum interfaces 704, 804 including a bleb 808 or blebs 708 without a separate fillable reservoir. The blood serum interfaces 704, 804 include a protective layer 712, 812 which may comprise a modified Stax-type finger splint 706, 806. These embodiments include at least one hole or perforation 713, 813 in the layer of protective material 712, 812, allowing the bleb 808 or blebs 708 to be filled with simulated blood serum 214 from the inside of the protective layer 712, 812. The hole or holes 713, 813 in the protective layer 712, 812 are configured to be large enough to allow the needle 834 of a syringe 832 through, but small enough to prevent a lancet 220 from fitting through. The finger splints 706, 806 also have open nail portions 718, 818, aiding in proper orientation on a patient/subject's finger and making the simulation more realistic.

FIGS. 40-43 show another embodiment of a blood serum interface 204 including a puncture-resistant thimble 208 and a latex or rubber-like finger cot 210. The finger cot 210, in this embodiment, is configured to fit around the thimble 208, hold simulated blood serum 214 within the intermediate space 212 between the finger cot 210 and the thimble 208, and seal against a patient/subject's finger 226 at the proximate end 218. The thimble 208 may be made up of metal, hard plastics, and/or any other material capable of protecting a finger 226 from puncture. Once the finger cot 210 is filled with simulated blood serum 214 and placed over the thimble 208 and the patient/subject's finger 226, the finger cot 210 can be punctured with a lancet 220. After lancet 220 puncture, a droplet 216 of blood serum 214 can be led onto a test tape 222 and tested for glucose levels with a glucometer 252.

It is to be understood that the invention can be embodied in various forms, and is not to be limited to the examples discussed above. The range of components and configurations which can be utilized in the practice of the present invention is virtually unlimited.

Having thus described the disclosed subject matter, what is claimed as new and desired to be secured by Letters Patent is:

1. A fluid analysis simulation and training system comprising:
   a semi-viscous simulated patient fluid configured for simulating the appearance of blood;
   a testing tape configured for receiving at least one droplet of said simulated patient fluid;
   a simulated glucometer configured for receiving said testing tape;
   said simulated glucometer comprising a processor and a display and connected to a communications network;
   an instructor computing device comprising a processor and connected to said communications network;
   an input/output (I/O) interface connected to said communications network, said simulated glucometer, and said instructor computing device;
   wherein input to said instructor computing device is configured for controlling output of displayed simulated glucometer data readings on said simulated glucometer display via said communications network;
   a simulated finger having one or more pierceable blebs configured for being filled with the simulated patient fluid, said simulated finger configured for placement over a manikin or standardized patient's finger;
   said fluid comprising:
   a preselected amount of glucose;
   water;
   protein or vegetable solution allowing use with standard glucometer testing tapes; and
   wherein said simulated patient fluid is semi-viscous and configured for simulating the appearance of blood.

2. The fluid analysis simulation and training system according to claim 1, wherein said simulated patient fluid is configured for being inserted into one or more pierceable blebs within a simulated finger.

3. The fluid analysis simulation and training system according to claim 1, wherein said preselected amount of glucose is selected from a group consisting of: low level blood glucose, normal level blood glucose, and high level blood glucose.

4. The fluid analysis simulation and training system according to claim 1, wherein said preselected amount of glucose is selected from a group consisting of: 40 mg % blood glucose, 80 mg % blood glucose, 100 mg % blood glucose, 125 mg % blood glucose, 175 mg % blood glucose, 200 mg % blood glucose, 250 mg % blood glucose, 300 mg % blood glucose, 400 mg % blood glucose, 500 mg % blood glucose, and 600 mg % blood glucose.

5. The fluid analysis simulation and training system according to claim 1, wherein said simulated patient fluid is configured for coagulation.

6. The fluid analysis simulation and training system according to claim 2, further comprising sealant configured for sealing holes in said simulated finger when exposed to air.

7. A fluid analysis simulation and training system comprising:
    a semi-viscous simulated patient fluid configured for simulating the appearance of blood;
    a testing tape configured for receiving at least one droplet of said simulated patient fluid;
    a simulated glucometer configured for receiving said testing tape;
    said simulated glucometer comprising a processor and a display and connected to a communications network;
    an instructor computing device comprising a processor and connected to said communications network;
    an input/output (I/O) interface connected to said communications network, said simulated glucometer, and said instructor computing device;
    wherein input to said instructor computing device is configured for controlling output of displayed simulated glucometer data readings on said simulated glucometer display via said communications network;
    a simulated finger having one or more pierceable blebs configured for being filled with said simulated patient fluid, said simulated finger configured for placement over a manikin or standardized patient's finger; and
    wherein said one or more blebs are configured for being punctured with an extracting instrument to extract said simulated patient fluid.

8. The fluid analysis simulation and training system according to claim 7, wherein said instructor computing device is selected from a group consisting of: a laptop computer; a desktop computer; a mobile device; and a tablet.

9. The fluid analysis simulation and training system according to claim 7, wherein said communications network is selected from a group consisting of: a wireless internet connection; a hard-wired internet connection; a Bluetooth connection; a wireless intranet connection; and a hard-wired intranet connection.

10. The fluid analysis simulation and training system according to claim 7, wherein said extracting instrument comprises a lancet.

11. A fluid analysis simulation and training method using a fluid analysis simulation and training system including simulated patient fluid; a testing tape configured for receiving at least one droplet of the simulated patient fluid; a simulated glucometer configured for receiving the testing tape; the simulated glucometer including a processor and a display and connected to a communications network; an instructor computing device including a processor and connected to the communications network; and an input/output (I/O) interface connected to the communications network, the simulated glucometer, and the instructor computing device, which method comprises the steps of:
    a user obtaining at least one droplet of said simulated patient fluid on said testing tape;
    said user placing said testing tape into said simulated glucometer;
    an instructor inputting simulated glucometer data into said instructor computing device based at least in part on actions of said user;
    said instructor computing device controlling output of displayed simulated glucometer data readings on said simulated glucometer display via said communications network;
    a simulated finger having one or more pierceable blebs configured for being filled with said simulated patient fluid, said simulated finger configured for placement over a manikin or standardized patient's finger; and
    wherein said one or more blebs are configured for being punctured with an extracting instrument to extract said simulated patient fluid.

12. The fluid analysis simulation and training method according to claim 11, wherein said instructor computing device is selected from a group consisting of: a laptop computer; a desktop computer; a mobile device; and a tablet.

13. The fluid analysis simulation and training method according to claim 11, wherein said communications network is selected from the group consisting of: a wireless internet connection; a hard-wired internet connection; a Bluetooth connection; a wireless intranet connection; and a hard-wired intranet connection.

14. The fluid analysis simulation and training method according to claim 11, wherein said fluid analysis simulation and training system further comprises:
    a simulated finger having one or more pierceable blebs configured for being filled with said simulated patient fluid; and
    an extracting instrument.

15. The fluid analysis simulation and training method according to claim 14, further comprising the steps of:
    filling said one or more blebs with said simulated patient fluid;
    placing said simulated finger over a manikin or standardized patient's finger; and
    said user piercing one of said blebs with said extracting instrument.

16. A fluid analysis simulation and training method using a fluid analysis simulation and training system including simulated patient fluid; a testing tape configured for receiving at least one droplet of the simulated patient fluid; a simulated glucometer configured for receiving the testing tape; the simulated glucometer including a processor and a display and connected to a communications network; an instructor computing device including a processor and connected to the communications network; an input/output (I/O) interface connected to the communications network, the simulated glucometer, and the instructor computing device; a simulated finger having one or more pierceable blebs configured for being filled with the simulated patient fluid; and an extracting instrument, which method comprises the steps of:

filling said one or more blebs with said simulated patient fluid;
placing said simulated finger over a manikin or standardized patient's finger;
a user piercing one of said blebs with said extracting instrument;
said user obtaining at least one droplet of said simulated patient fluid on said testing tape;
said user placing said testing tape into said simulated glucometer;
an instructor inputting simulated glucometer data into said instructor computing device based at least in part on actions of said user; and
said instructor computing device controlling output of displayed simulated glucometer data readings on said simulated glucometer display via said communications network.

* * * * *